United States Patent
Shionoiri et al.

(10) Patent No.: US 8,712,481 B2
(45) Date of Patent: Apr. 29, 2014

(54) ELECTRIC POWER SUPPLY SYSTEM AND ELECTRIC POWER SUPPLY SYSTEM FOR MOTOR VEHICLE

(75) Inventors: Yutaka Shionoiri, Isehara (JP); Jun Koyama, Sagamihara (JP); Yoshiyuki Kurokawa, Sagamihara (JP); Shunpei Yamazaki, Setagaya (JP); Takayuki Ikeda, Atsugi (JP); Takeshi Osada, Isehara (JP); Tomoaki Atsumi, Isehara (JP); Masato Ishii, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 423 days.

(21) Appl. No.: 12/841,381

(22) Filed: Jul. 22, 2010

(65) Prior Publication Data

US 2010/0289331 A1    Nov. 18, 2010

Related U.S. Application Data

(62) Division of application No. 11/716,584, filed on Mar. 12, 2007.

(30) Foreign Application Priority Data

Mar. 15, 2006  (JP) .................. 2006-070379

(51) Int. Cl.
   *H04B 1/38* (2006.01)
   *H04M 1/00* (2006.01)
(52) U.S. Cl.
   USPC ........ 455/572; 455/569.2; 455/571; 455/573; 455/575.9
(58) Field of Classification Search
   USPC ............... 455/572, 569.2, 571, 573, 575.9
   See application file for complete search history.

(56) References Cited

U.S. PATENT DOCUMENTS

| 4,560,916 | A | 12/1985 | Yoshiyuki et al. |
| 5,477,217 | A | * 12/1995 | Bergan ................ 340/933 |

(Continued)

FOREIGN PATENT DOCUMENTS

| CN | 1671077 | 9/2005 |
| EP | 1385120 A | 1/2004 |

(Continued)

OTHER PUBLICATIONS

Chinese Office Action (Application No. 200780005996.3) Dated Nov. 18, 2010.

(Continued)

*Primary Examiner* — Huy C Ho
(74) *Attorney, Agent, or Firm* — Eric J. Robinson; Robinson Intellectual Property Law Office, P.C.

(57) ABSTRACT

To provide for a movable electronic device a power receiving device that when charging a battery, simplifies charging of the battery from a power feeder, which is a power supply means, and does not have faults due to an external factor relating to a relay terminal, or damage of the relay terminal, that are caused by directly connecting the battery and the power feeder, and further, to provide an electronic device including the power receiving device. An antenna circuit and a booster antenna for supplying electric power are provided in a movable electronic device. The antenna circuit receives a radio signal such as an electromagnetic wave via the booster antenna, and electric power that is obtained through the receiving of the radio signal is supplied to the battery through a signal processing circuit.

20 Claims, 29 Drawing Sheets

(56) References Cited

U.S. PATENT DOCUMENTS

| | | | |
|---|---|---|---|
| 5,524,044 A * | 6/1996 | Takeda | 455/571 |
| 5,654,621 A | 8/1997 | Seelig | |
| 6,026,921 A * | 2/2000 | Aoyama et al. | 180/65.25 |
| 6,837,438 B1 | 1/2005 | Takasugi et al. | |
| 6,840,448 B2 | 1/2005 | Fukushima et al. | |
| 7,737,658 B2 | 6/2010 | Sennami et al. | |
| 2002/0157881 A1 | 10/2002 | Bakholdin et al. | |
| 2004/0041025 A1 | 3/2004 | Fukushima et al. | |
| 2004/0245473 A1 | 12/2004 | Takayama et al. | |
| 2005/0254183 A1 | 11/2005 | Ishida et al. | |

FOREIGN PATENT DOCUMENTS

| | | | |
|---|---|---|---|
| JP | 02-236204 A | 9/1995 | |
| JP | 2000-137779 A | 5/2000 | |
| JP | 2001-092930 A | 4/2001 | |
| JP | 2002-231545 | 8/2002 | |
| JP | 2003-111312 A | 4/2003 | |
| JP | 2003-218624 | 7/2003 | |
| JP | 2003-299255 | 10/2003 | |
| JP | 2003-299255 A | 10/2003 | |
| JP | 2004-029873 A | 1/2004 | |
| JP | 2004-129315 A | 4/2004 | |
| JP | 2004-229421 A | 8/2004 | |
| JP | 2005-150022 | 6/2005 | |
| JP | 2005-168085 A | 6/2005 | |
| JP | 2005-210843 | 8/2005 | |
| JP | 2005210843 A * | 8/2005 | B60L 11/18 |
| JP | 2005-354888 | 12/2005 | |
| WO | WO-2004/025805 | 3/2004 | |

OTHER PUBLICATIONS

International Search Report (Application No. PCT/JP2007/054747) dated Apr. 10, 2007.

Written Opinion (Application No. PCT/JP2007/054747) dated Apr. 10, 2007.

Office Action (Application No. 200780005996.3) dated Apr. 13, 2010.

* cited by examiner

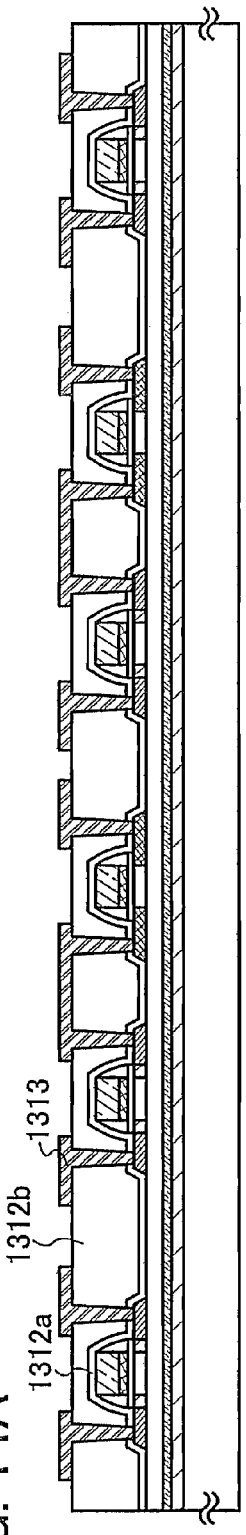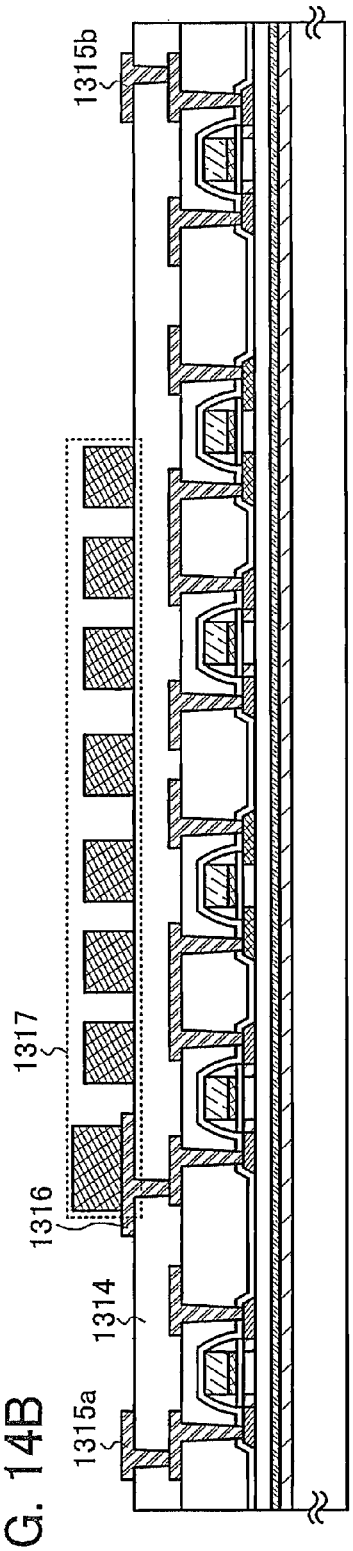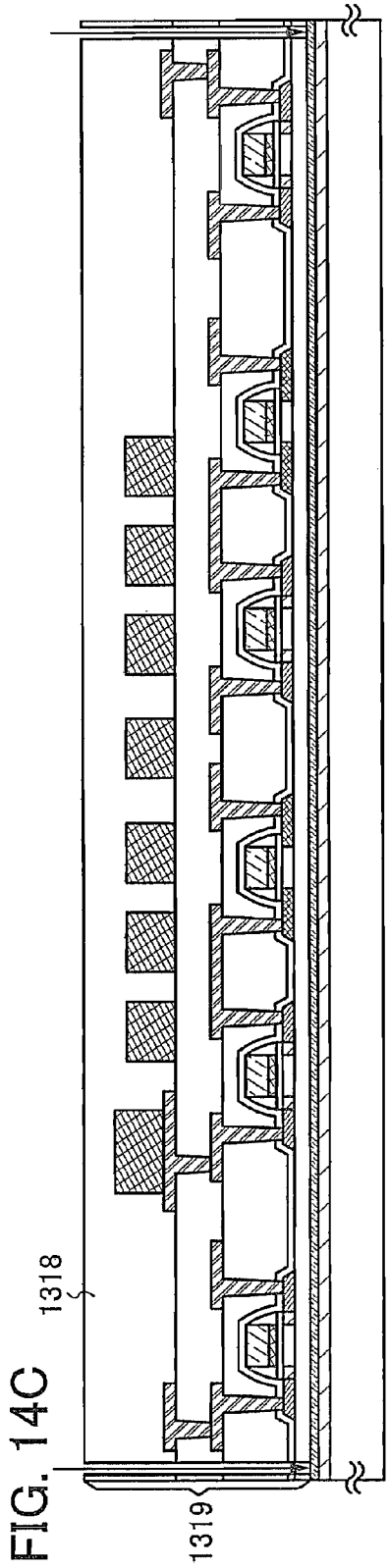

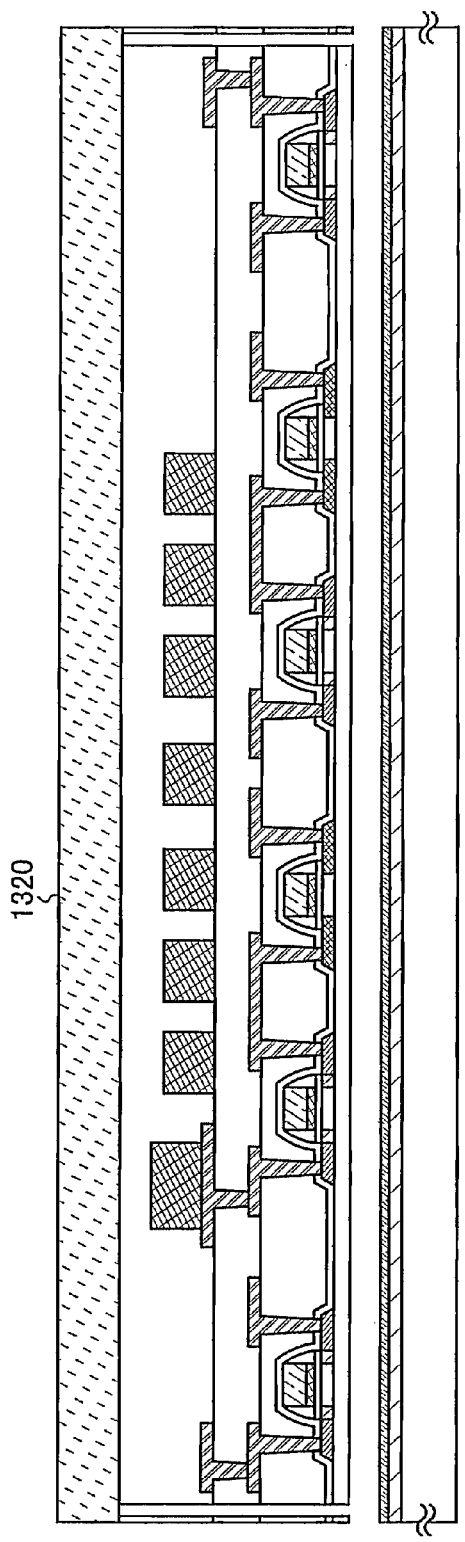
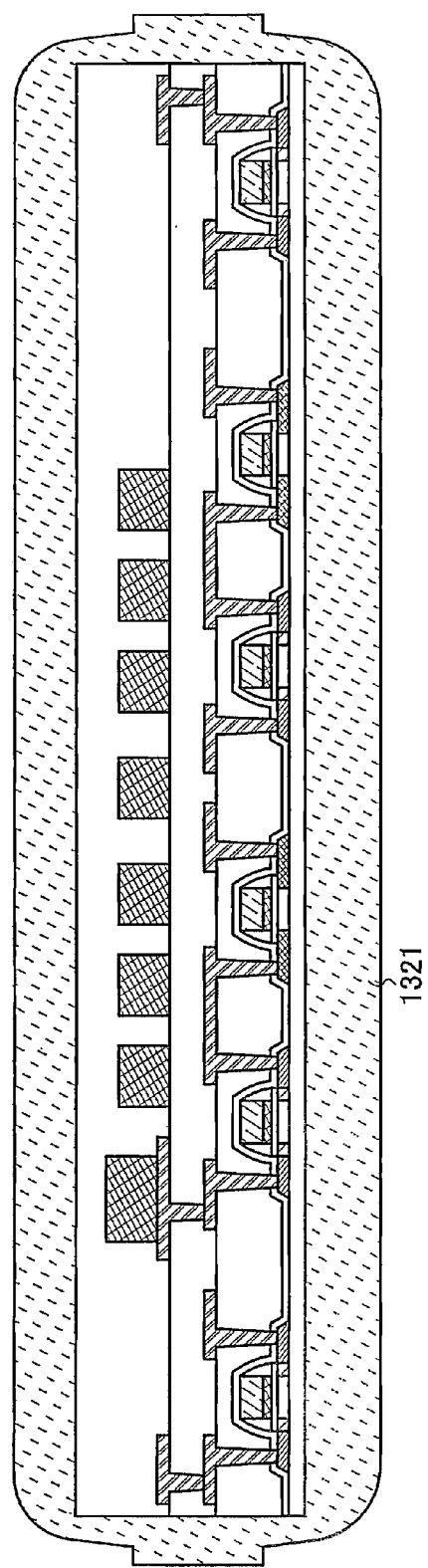
FIG. 15A
FIG. 15B

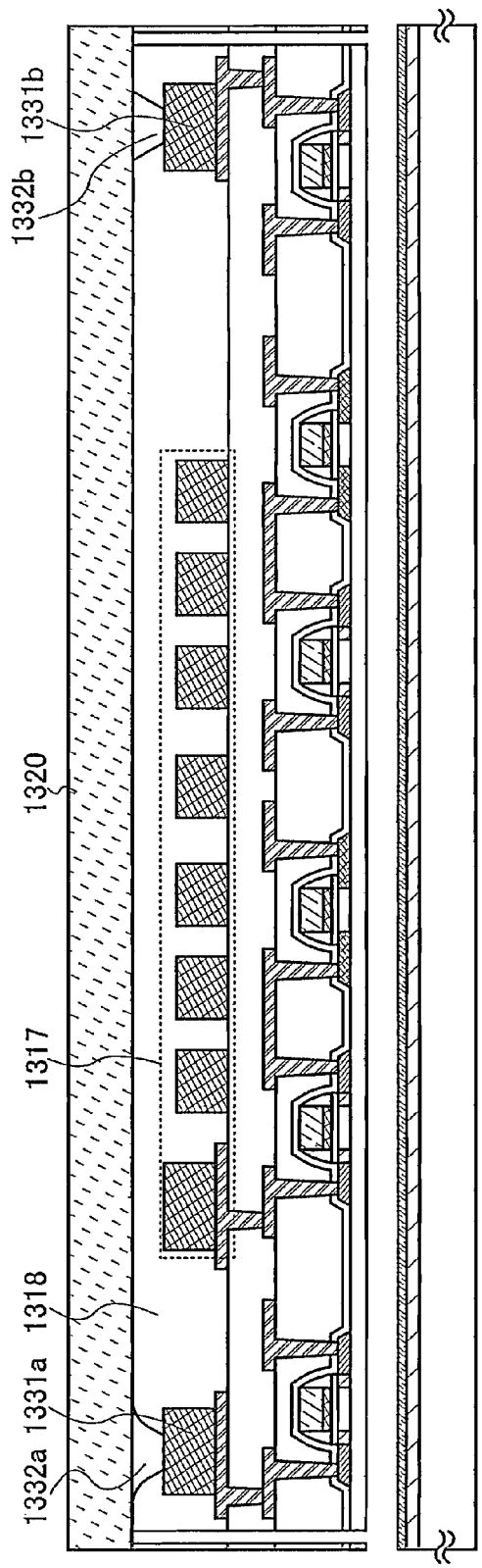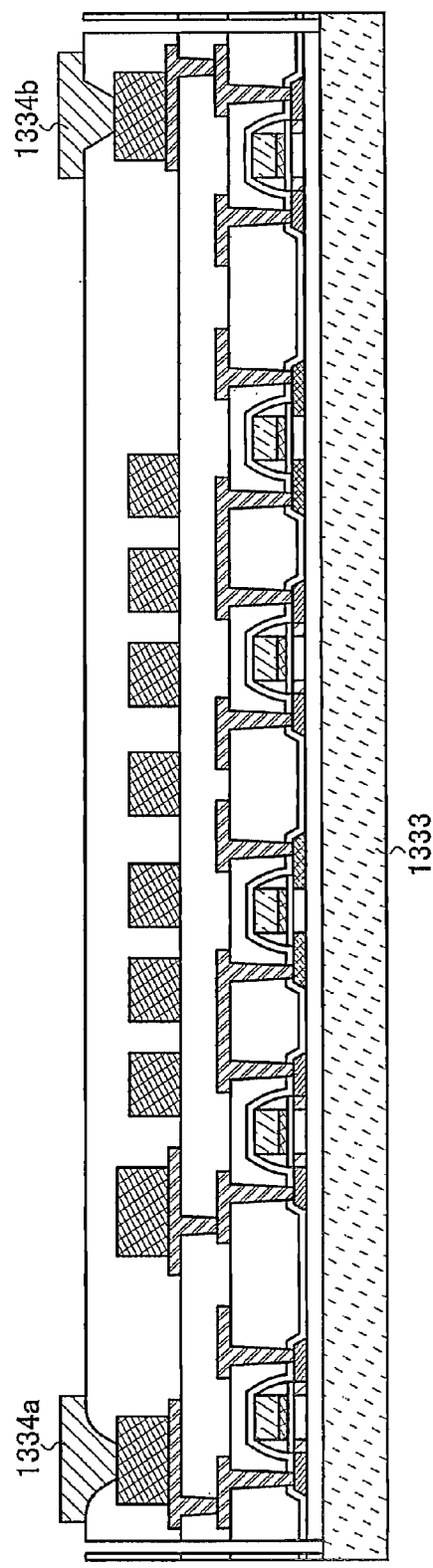

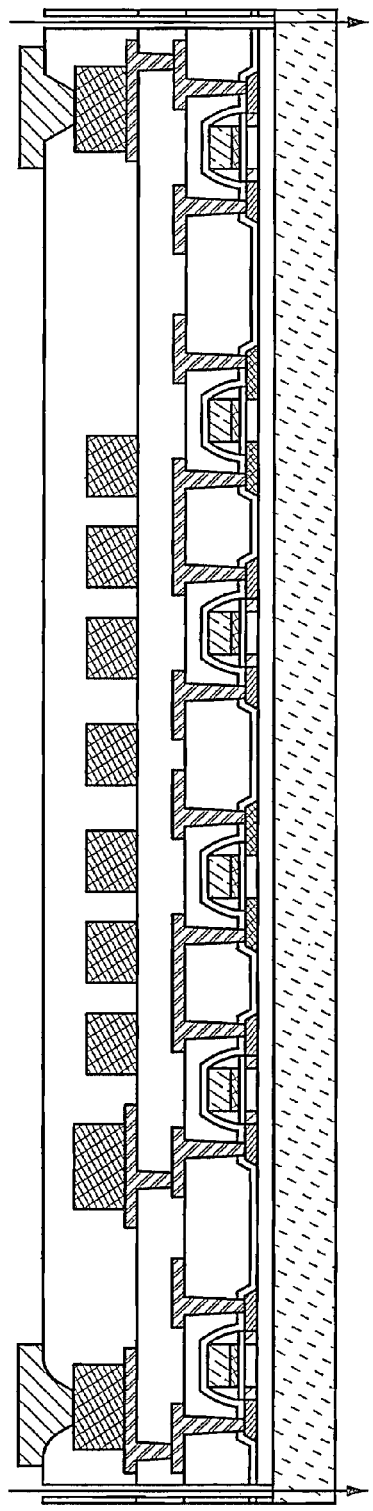
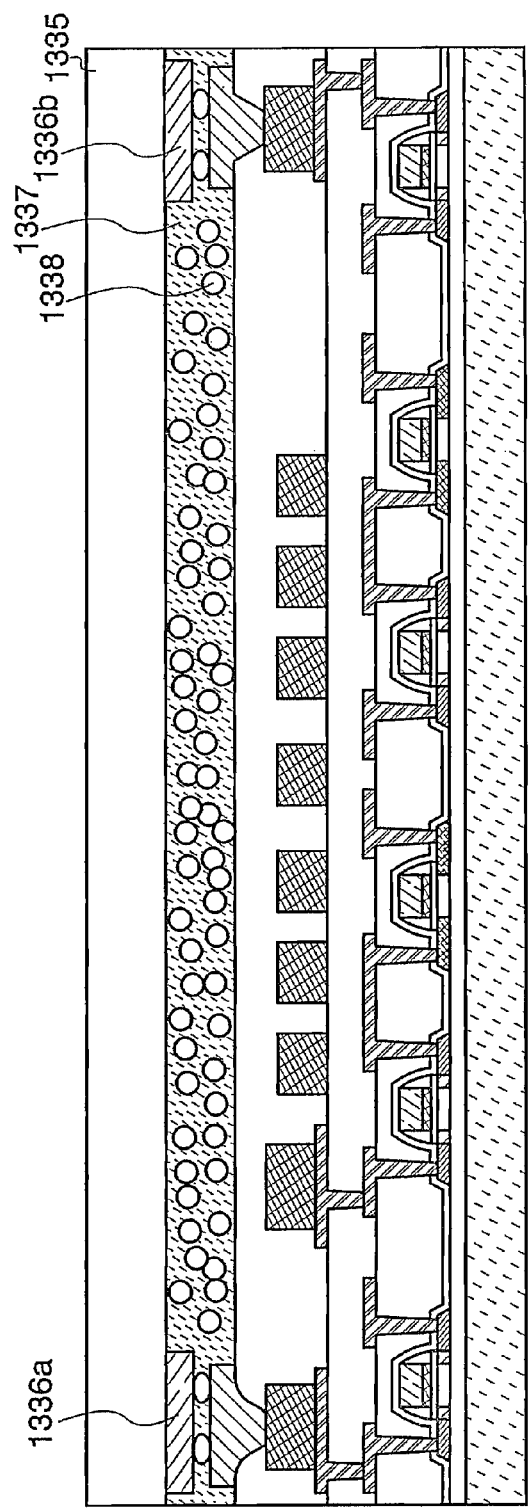
FIG. 17A
FIG. 17B

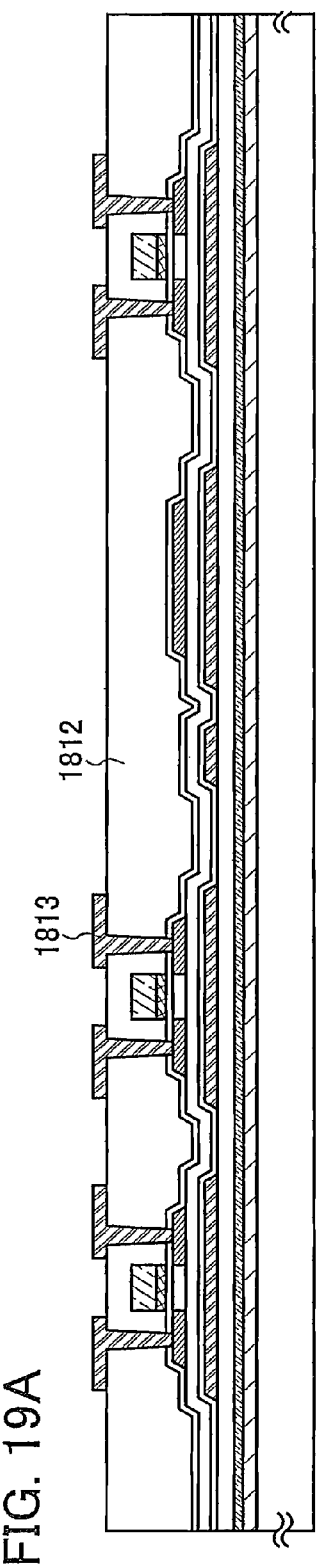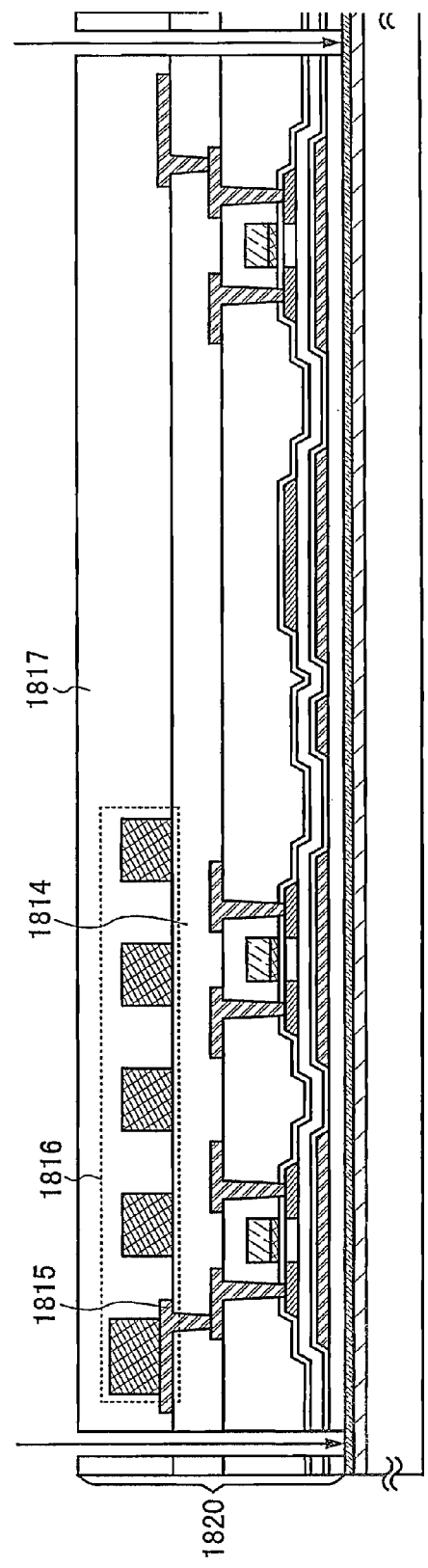

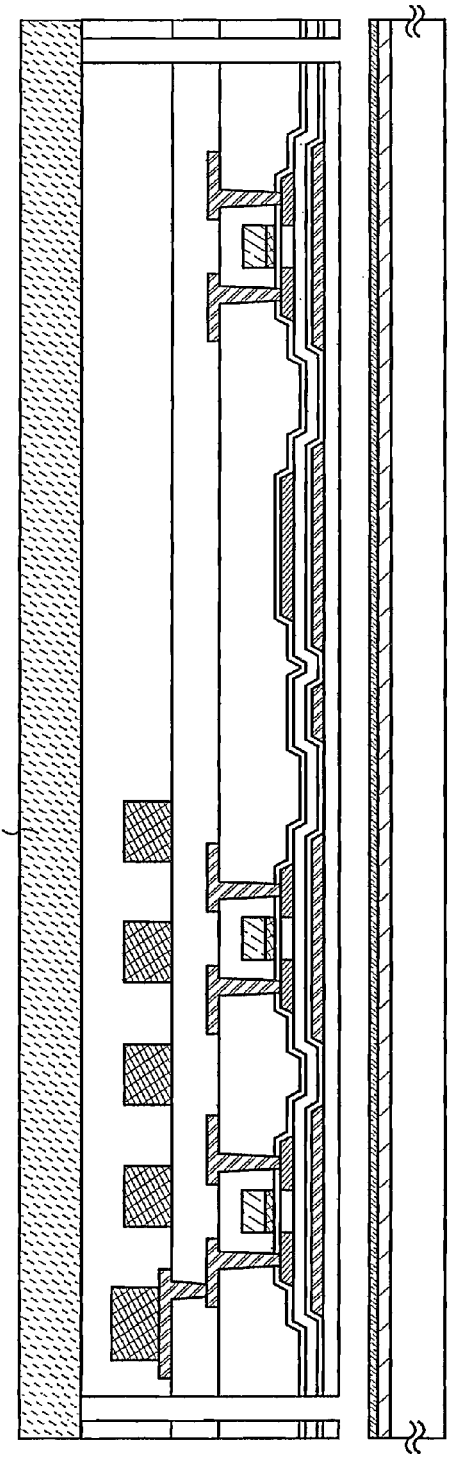
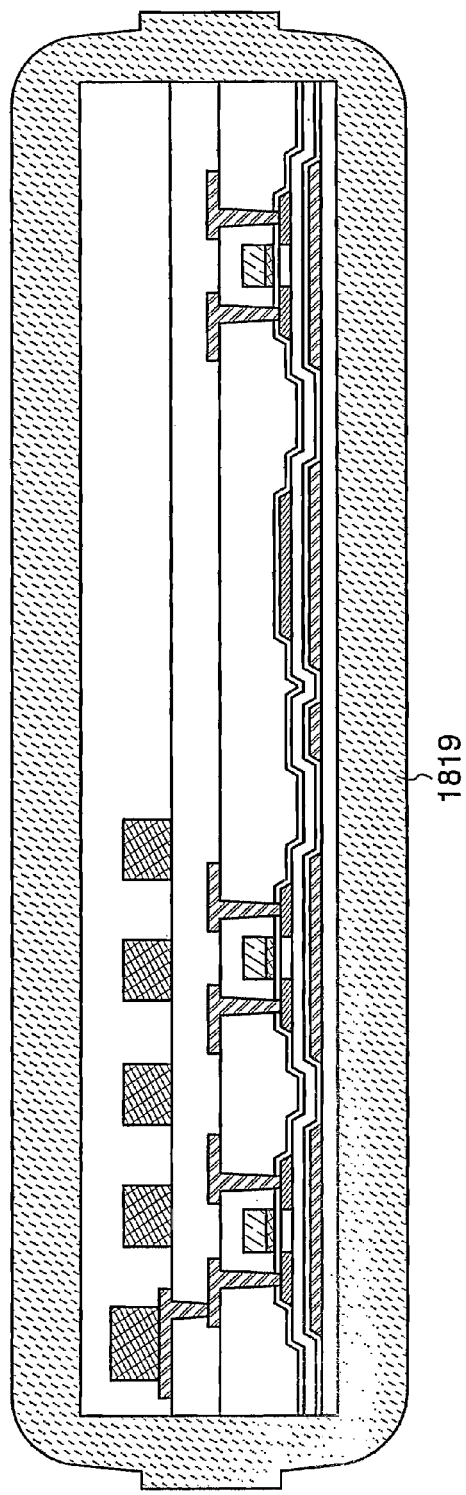
FIG. 20A
FIG. 20B

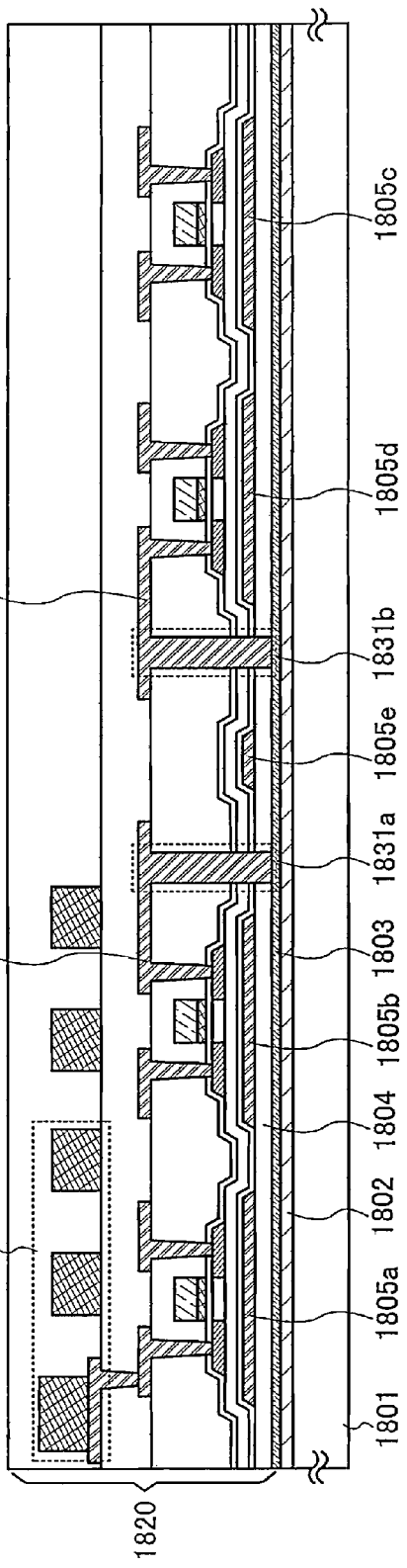

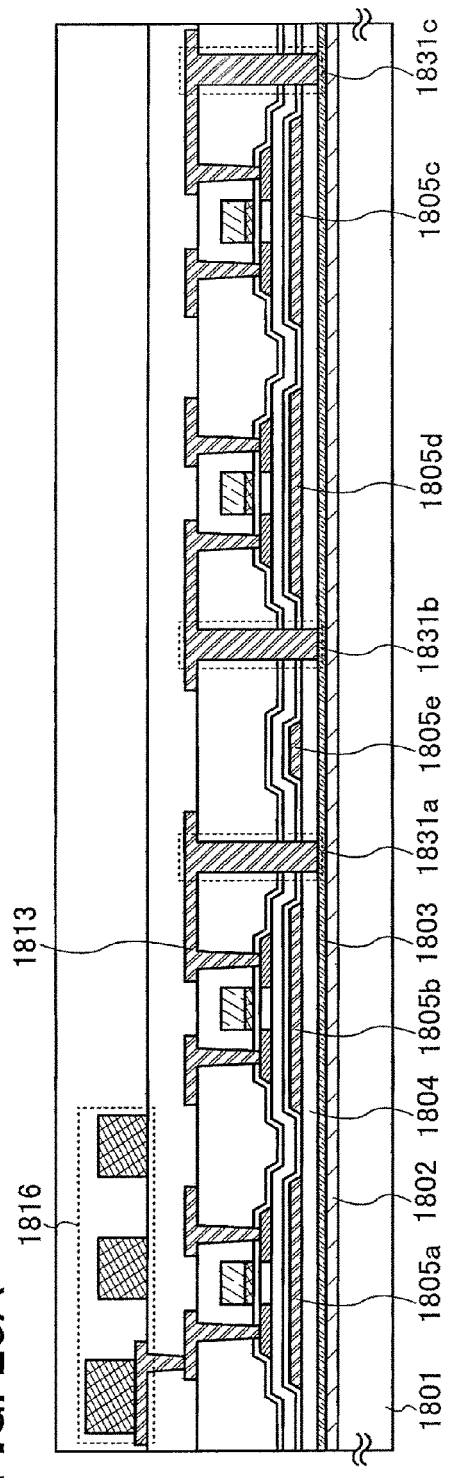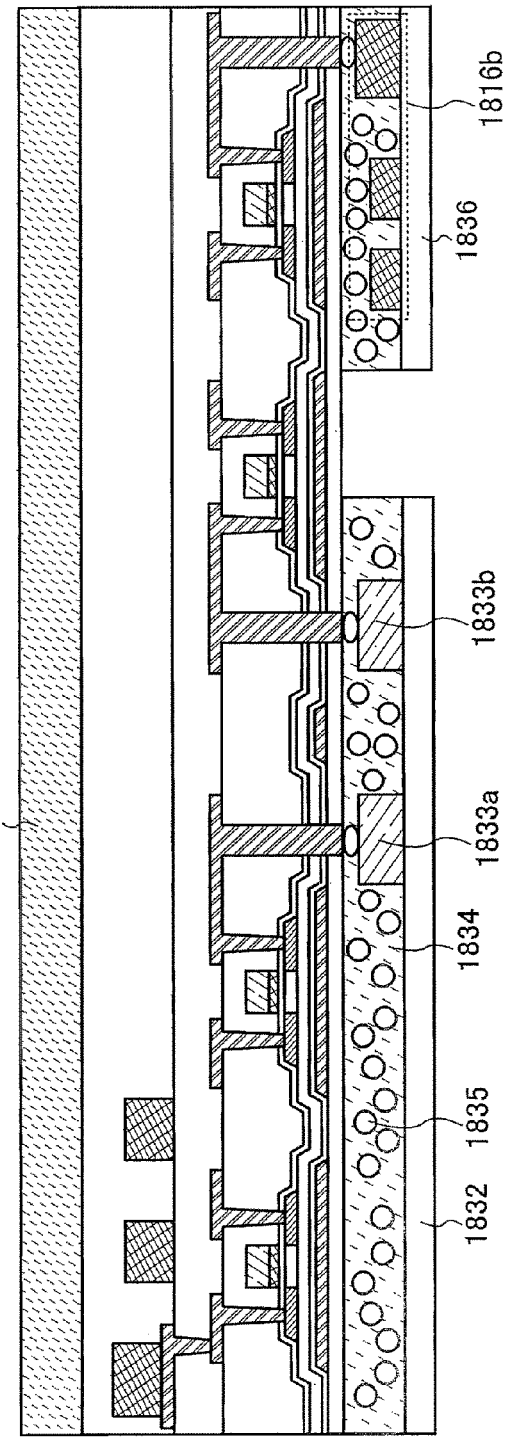

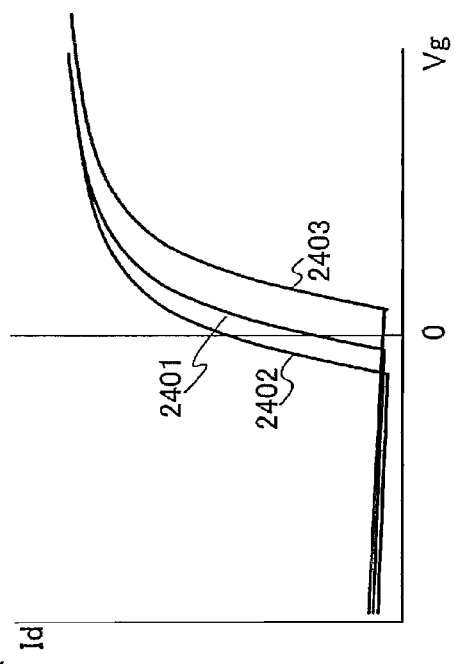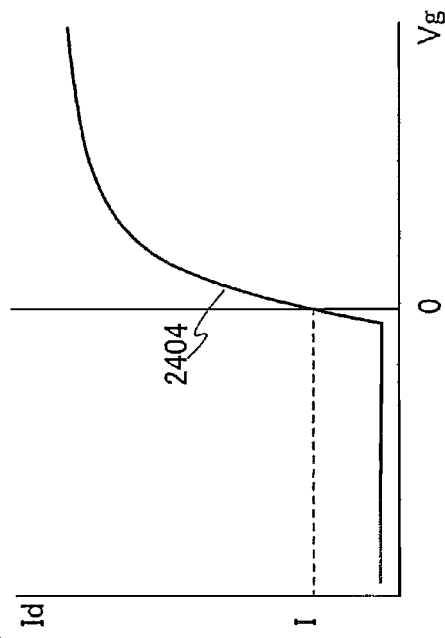

ELECTRIC POWER SUPPLY SYSTEM AND ELECTRIC POWER SUPPLY SYSTEM FOR MOTOR VEHICLE

TECHNICAL FIELD

The present invention relates to power receiving devices. In particular, the invention relates to power receiving devices that receive electric power via radio waves. Further, the invention relates to a power receiving device having an antenna for receiving electric power through radio waves, and to an electric power supply system using a power feeder having an antenna for supplying electric power to the power receiving device via radio waves.

Note that 'power receiving device' as referred to in this specification means devices in general which receive electric power supply via a radio signal, from an externally located electric power supply device.

BACKGROUND ART

Various electric appliances are coming into wide use and a wide variety of appliances are on the market. In particular, in recent years the spread of portable electronic devices has been marked. As an example, portable telephones, digital video cameras, and the like, have become very convenient, having display portions with high definition and batteries that are more durable and have low power consumption. As a power source for driving portable electronic devices, a battery, which is a charging means, is built-in. As a battery, a secondary cell (hereinafter referred to as a 'battery') such as a lithium ion battery is used. As matters now stand, the battery is charged from an AC adaptor which is plugged into a household alternating current power supply, which is a power supply means (see Reference 1: Japanese Published Patent Application No. 2005-150022).

Note that means of transportation such as bicycles, motor vehicles (including electric vehicles, and means of transportation that drive forward by electric power, regardless of whether they have four wheels or two), and the like are also included in the category of electronic devices having a battery. Accordingly, in this specification, portable electronic devices and means of transportation which have a battery are all referred to as 'movable electronic devices' ('movable devices').

DISCLOSURE OF INVENTION

However, the frequency of usage of movable electronic devices such as portable telephones and digital video cameras has risen steadily, and there is a limit to improving the durability and reducing the power consumption of batteries for coping with the operating time. Further, for charging batteries which are a power source that are built into portable telephones, digital video cameras, and the like, there have not been any methods other than charging from a charger through an AC adaptor via a household alternating current power supply or from a commercially available primary cell. Therefore, charging has been troublesome for users, and it has been necessary for users to take an AC adaptor or a primary cell which is a power supply means with them when they are moving about outdoors, which is burdensome.

Further, in motor vehicles, which are movable electronic devices, battery charging is conducted by a combustion engine. However, ignition of a spark plug by electric power charged to a battery is required to start up the combustion engine. Therefore, when the battery has 'gone flat' due to the motor vehicle not being used for a certain period of time, ignition of the spark plug cannot be conducted, and to start up the combustion engine it is necessary to conduct electric power supply directly from outside the vehicle using a cable, which is a problem in terms of safety and convenience.

In addition, for charging from a household alternating current power supply using an AC adaptor or charging from a commercially available primary cell, it is necessary to provide a relay terminal as a portion which conducts electricity to the battery in the movable electronic device. Therefore, a structure in which the relay terminal is exposed or a structure in which the relay terminal is exposed through a protective portion results. Accordingly, there has been a problem in that malfunctions occur when the relay terminal is damaged or defective.

Therefore, an object of the invention is to provide for a movable electronic device a power receiving device that simplifies charging a battery, which is a charging means, from a power feeder, which is a power supply means, and in which there is no possibility of malfunctions occurring due to an external factor relating to the relay terminal for directly connecting the battery and the power supply means, and no possibility of damage to the relay terminal itself. Further, an object of the invention is to provide an electronic device including the power receiving device.

In view of the foregoing, the invention provides an antenna circuit for supplying electric power in a movable electronic device. Further, in the invention, electric power is supplied to the antenna circuit via a radio signal such as an electromagnetic wave. The radio signal is supplied to a battery as electric power through a signal processing circuit, thereby charging the battery. Below, a specific structure of the invention will be described.

A power receiving device of the invention includes an antenna circuit, a signal processing circuit, and a battery. The antenna circuit receives a radio signal, and the radio signal is input to the battery via the signal processing circuit, whereupon the battery is charged.

Further, a power receiving device of the invention which is different to the above-mentioned power receiving device includes an antenna circuit, a signal processing circuit, and a battery. The antenna circuit receives a radio signal which is supplied from a power feeder, and the radio signal is input to the battery via the signal processing circuit, whereupon the battery is charged.

Another power receiving device of the invention includes an antenna circuit, a booster antenna, a signal processing circuit, and a battery. The antenna circuit receives a radio signal through the booster antenna, and the radio signal is input to the battery via the signal processing circuit, whereupon the battery is charged.

Yet another power receiving device of the invention includes an antenna circuit, a booster antenna, a signal processing circuit, and a battery. The antenna circuit receives a radio signal through the booster antenna which is supplied from a power feeder, and the radio signal is input to the battery via the signal processing circuit, whereupon the battery is charged.

A battery in the invention may supply electric power to a power supply circuit included in the signal processing circuit.

An antenna circuit in the invention may receive a radio signal using an electromagnetic induction method.

A battery in the invention may be a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, or a capacitor.

Further, the invention may be an electronic device including a power receiving device.

Further, the electronic device of the invention may be any one of a portable telephone, a notebook computer, a digital camera, a portable image reproduction device, a digital video camera, a portable information terminal, a television, a motor vehicle, and a bicycle.

A power receiving device of the invention includes an antenna circuit. Therefore, it is not necessary to provide a relay terminal as a portion which conducts electricity to a battery in a movable electronic device, and power can be supplied to the battery by a radio signal without malfunctions caused by damage to or defects in a relay terminal. In addition, since a power supply means for conducting power supply supplies power to a movable electronic device having a battery that is a charging device via a radio signal, charging can be conducted anytime, without the need for carrying a charger or a primary cell for charging.

BRIEF DESCRIPTION OF DRAWINGS

FIGS. 14A to 14C show a manufacturing method of a power receiving device of Embodiment Mode 3.
FIGS. 15A and 15B show a manufacturing method of a power receiving device of Embodiment Mode 3.
FIGS. 16A and 16B show a manufacturing method of a power receiving device of Embodiment Mode 3.
FIGS. 17A and 17B show a manufacturing method of a power receiving device of Embodiment Mode 3.
FIGS. 19A and 19B show a manufacturing method of a power receiving device of Embodiment Mode 4.
FIGS. 20A and 20B show a manufacturing method of a power receiving device of Embodiment Mode 4.
FIGS. 22A and 22B show a manufacturing method of a power receiving device of Embodiment Mode 4.
FIGS. 23A and 23B show a manufacturing method of a power receiving device of Embodiment Mode 4.
FIGS. 24A and 24B show characteristics of a power receiving device of Embodiment Mode 4.

BEST MODE FOR CARRYING OUT THE INVENTION

Embodiment Modes

Figure 1:
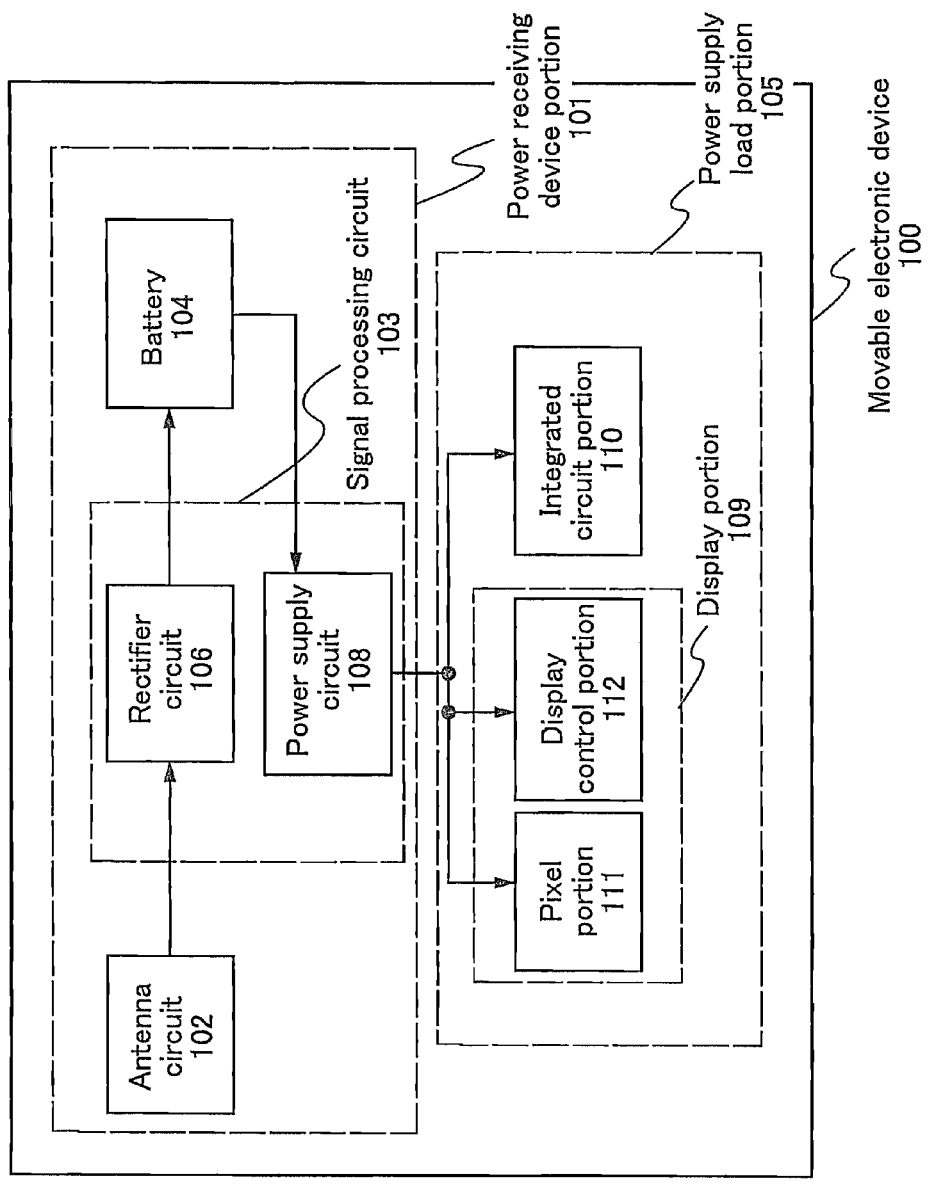
FIG. 1 shows a structure of a power receiving device of Embodiment Mode 1.

Hereinafter, embodiment modes of the invention will be described with reference to the accompanying drawings. However, the invention can be carried out in many different modes, and those skilled in the art will appreciate that a variety of modifications can be made to the embodiment modes and their details without departing from the spirit and scope of the invention. Accordingly, the invention should not be construed as being limited to the description of the embodiment modes below. Note that in the following description of structures of the invention, like reference numerals are used to indicate like parts in the drawings.

Embodiment Mode 1

A structure of a movable electronic device having a power receiving device of the invention will be described, with reference to the block diagrams of FIGS. 1 and 2.

A movable electronic device 100 in FIG. 1 includes a power receiving device portion 101 and a power supply load portion 105. The power receiving device portion 101 includes an antenna circuit 102, a signal processing circuit 103, and a battery 104. The signal processing circuit 103 includes a rectifier circuit 106 and a power supply circuit 108.

Note that the power supply circuit 108 in FIG. 1 supplies electric power to the power supply load portion 105. However, since the configuration of the power supply load portion 105 differs from movable electronic device to movable electronic device, in this embodiment mode, a case where the configuration is that of a portable telephone or a digital video camera is described. Accordingly, the power supply circuit 108 supplies power to a display portion 109 and an integrated circuit portion 110. Note that the integrated circuit portion 110 is a circuit portion which processes signals other than those of the display portion, and since the configuration of the integrated circuit portion 110 differs from movable electronic device to movable electronic device, it will not be explained in detail in this specification. The display portion 109 includes a pixel portion 111 and a display control portion 112 for controlling the pixel portion 111. The display control portion 112 is electrically connected the signal processing circuit 103. The type of display element provided in a pixel of the display portion 109 is of course not limited. An electroluminescent element, a liquid crystal element, or the like may be used. The type of display element used is selected appropriately according to the intended use of the movable electronic device or the like.

Figure 2:
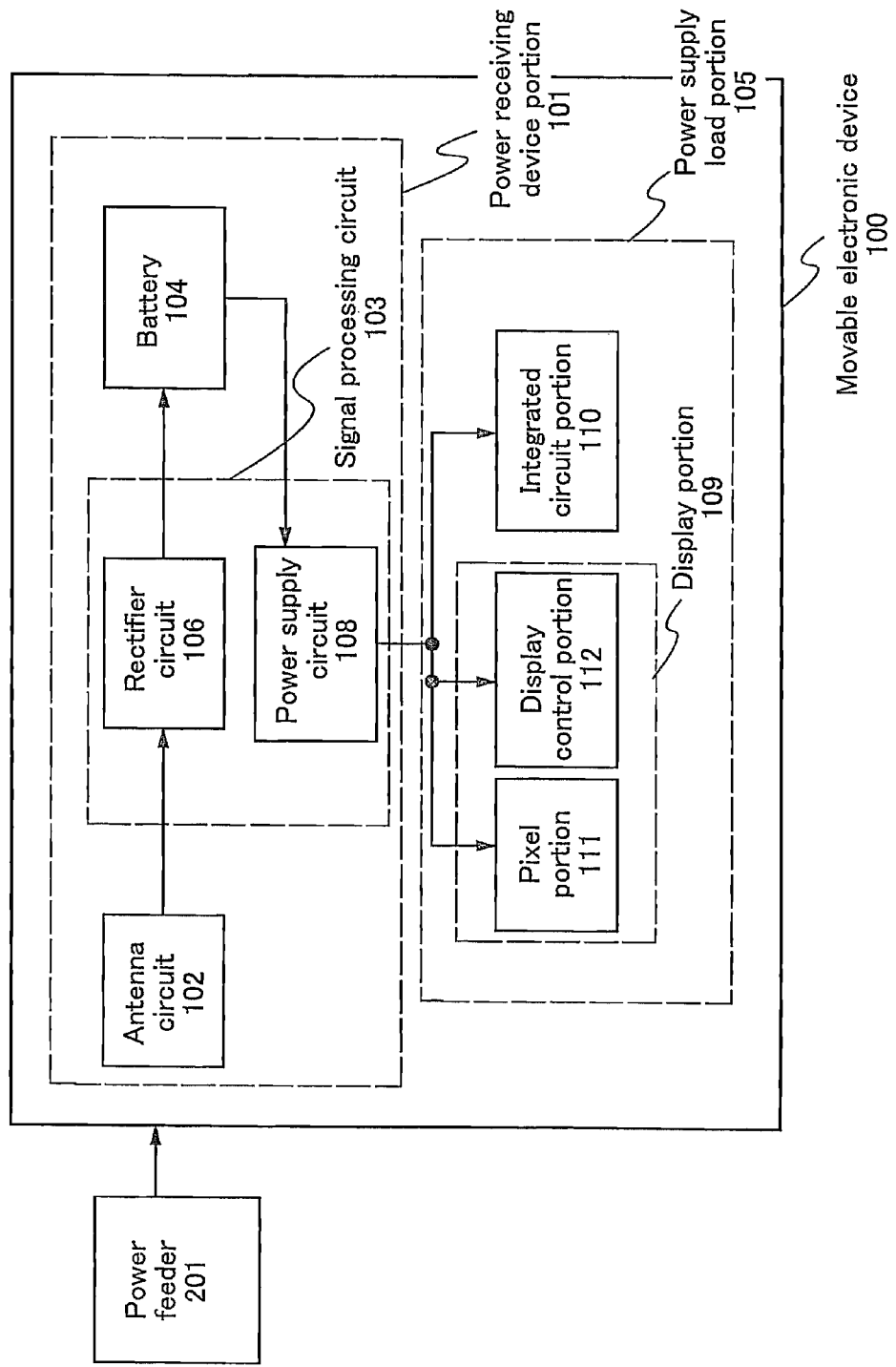
FIG. 2 shows a structure of a power receiving device of Embodiment Mode 1.

Further, FIG. 2 is a block diagram showing a configuration in which the antenna circuit 102 receives a signal from a power feeder 201. In FIG. 2, the electric power received by the antenna circuit 102 is input to the battery 104 via the rectifier circuit 106. From the battery 104, a suitable amount of electric power is supplied to the power supply circuit 108.

Figure 3A:
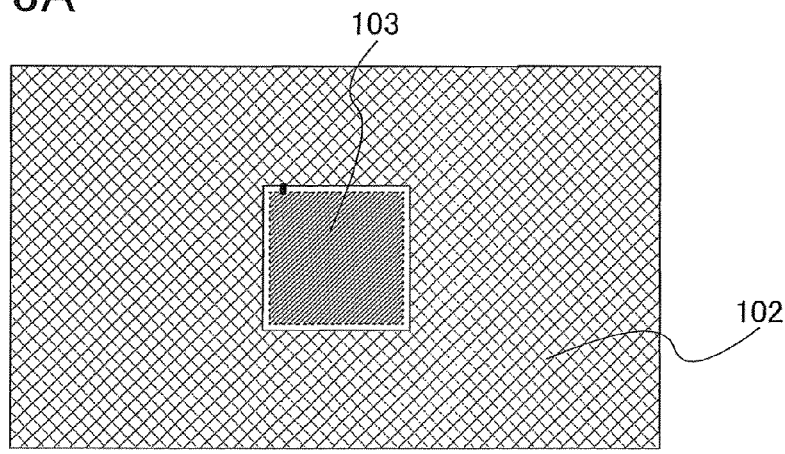
FIGS. 3A to 3E show structures of a power receiving device of Embodiment Mode 1.
Figure 3B:
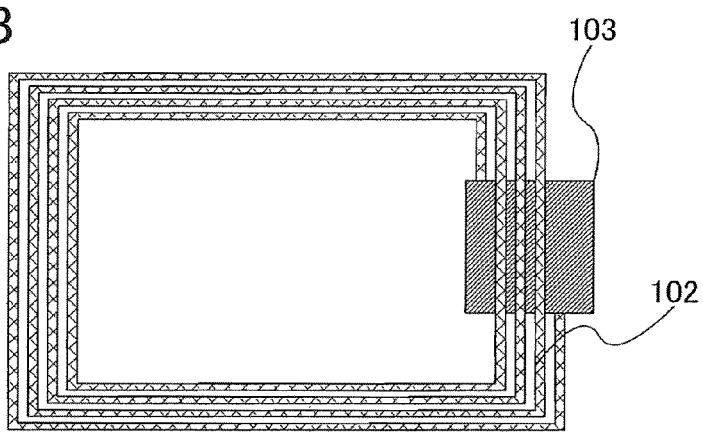
Figure 3C:
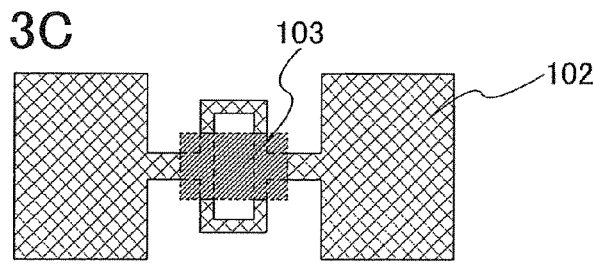
Figure 3D:
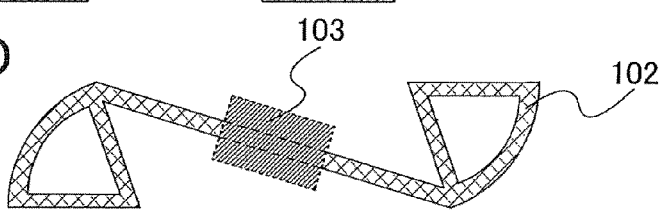
Figure 3E:
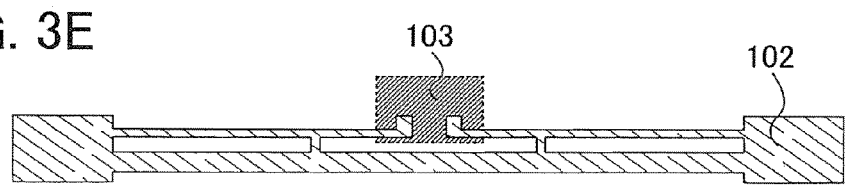
Figure 4A:
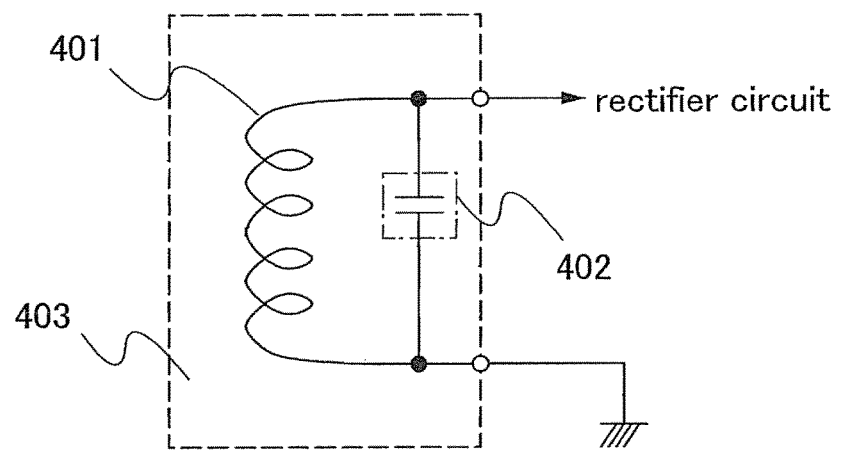
FIGS. 4A and 4B show structures of a power receiving device of Embodiment Mode 1.

Note that there is no particular limitation on the form of the antenna in the antenna circuit 102. For example, a structure may be used in which the antenna circuit 102 is disposed all around the signal processing circuit 103, as shown in FIG. 3A. Alternatively, a structure may be used in which the signal processing circuit 103 is disposed so as to overlap with the antenna circuit 102, which is formed in loops, as shown in FIG. 3B. Further, as shown in FIG. 3C, the signal processing circuit 103 may be disposed, and the antenna circuit 102 may have a form suited to receiving high frequency electromagnetic waves. Alternatively, as shown in FIG. 3D, the signal processing circuit 103 may be disposed, and the antenna circuit 102 may be 180 degree non-directional (such that it can receive signals equally from any direction). Further alternatively, as shown in FIG. 3E, the signal processing circuit 103 may be disposed, and the antenna circuit 102 may have a long rod-shape and fold back on itself. Further, a patch antenna may also be used, although it is not illustrated. Moreover, the connection of the signal processing circuit 103 with the antenna in the antenna circuit 102 is not limited to the structures shown in the drawings. For example, the antenna circuit 102 and the signal processing circuit 103 may be disposed in separate positions and connected by a wiring, or may be connected by being disposed close to each other. In this embodiment mode, the form in FIG. 3B is adopted as the form of the antenna circuit 102, and explanation is given assuming that electromagnetic waves are received by the antenna circuit, and electric power is obtained by electromagnetic induction. Further, the case where the antenna circuit 102 includes an antenna 401 and a resonant capacitor 402, as shown in FIG. 4A, is explained. The combination of the antenna 401 and the resonant capacitor 402 is referred to as 'antenna circuit 403'.

Figure 4B:
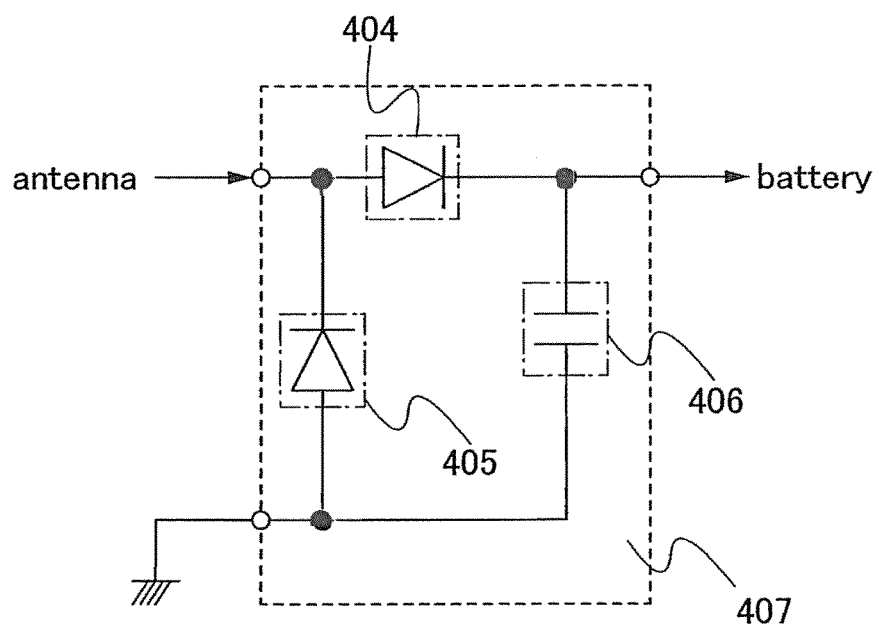

Further, the rectifier circuit 106 may be a circuit which converts an alternating current signal, which is induced by an electromagnetic wave that the antenna circuit 102 receives, into a direct current signal. For example, a rectifier circuit 407 which includes a diode 404, a diode 405, and a smoothing capacitor 406, as shown in FIG. 4B, may be formed.

Further, the power feeder 201 in FIG. 2 will be described with reference to FIG. 5. A power feeder 600 in FIG. 5 includes a power transmission control portion 601 and an antenna circuit 602. The power transmission control portion 601 converts an electric signal which is for power transmission that is to be sent to the power receiving device portion 101 in the movable electric device, and outputs an electromagnetic wave which is for transmitting from the antenna circuit 602.

Figure 5:
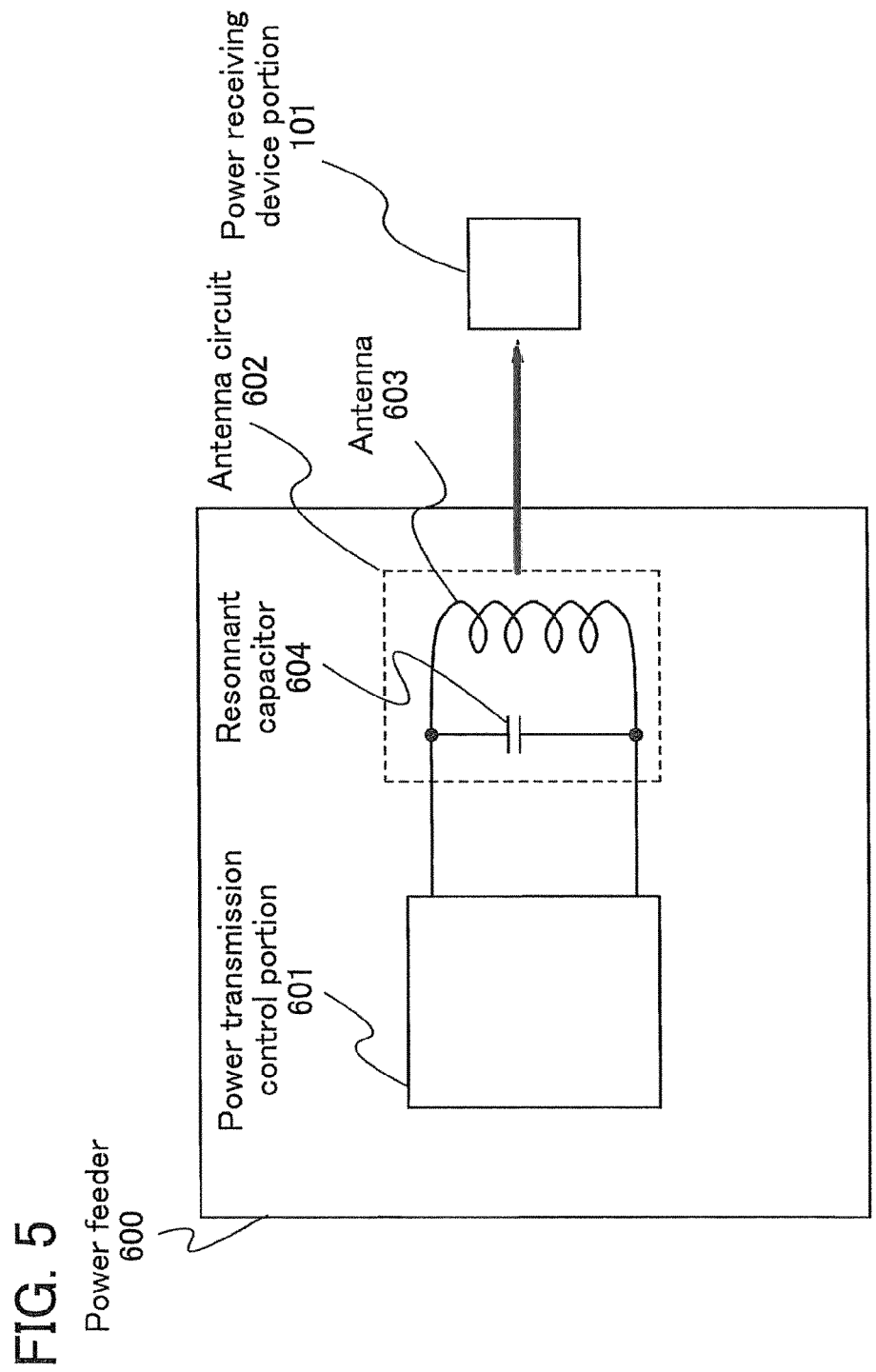
FIG. 5 shows a structure of a power receiving device of Embodiment Mode 1.

In this embodiment mode, similarly to the antenna circuit 102 in the power receiving device portion 101, the antenna circuit 602 of the power feeder 600 shown in FIG. 5 is connected to the power transmission control portion 601, and includes an antenna 603 and a resonant capacitor 604 which form an LC parallel resonant circuit. As for the power transmission control portion 601, when power is transmitted, current flows through the antenna circuit 602, and the power transmission control portion 601 outputs electromagnetic waves which are for transmitting to the power receiving device portion 101 from the antenna 603.

Figure 6:
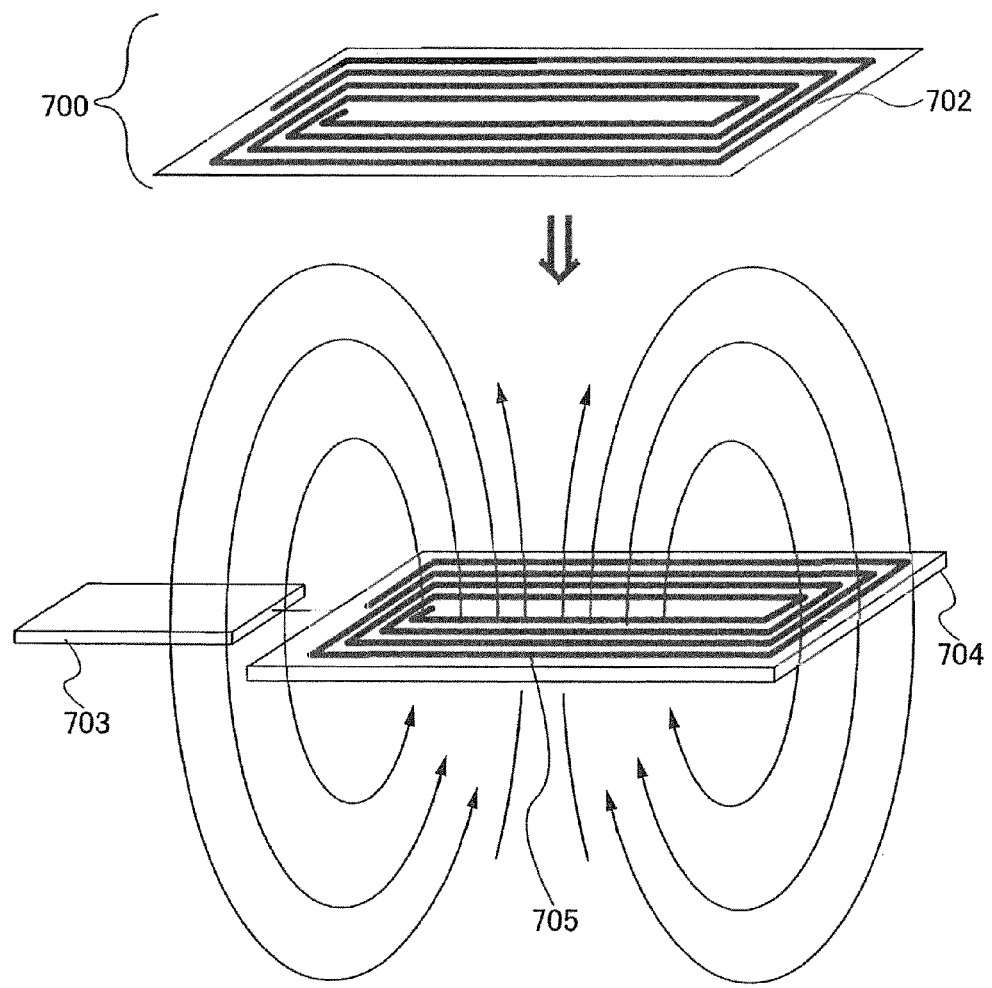
FIG. 6 shows a structure of a power receiving device of Embodiment Mode 1.

Note that as described above, in this embodiment mode, according to the shape of the antenna in the antenna circuit, radio signals that are for the antenna circuit 102 to receive are exchanged by an electromagnetic induction method. Therefore, the power receiving device portion 101 in FIGS. 1 and 2 has a structure which includes the coiled antenna circuit 102. For example, FIG. 6 shows the positional relationship, and the shape of an antenna, of an antenna circuit in a movable electronic device that includes a power receiving device portion. FIG. 6 shows a structure in which the antenna circuit in the power receiving device portion receives electromagnetic waves which are for transmitting from the antenna of the power feeder.

Figure 7:
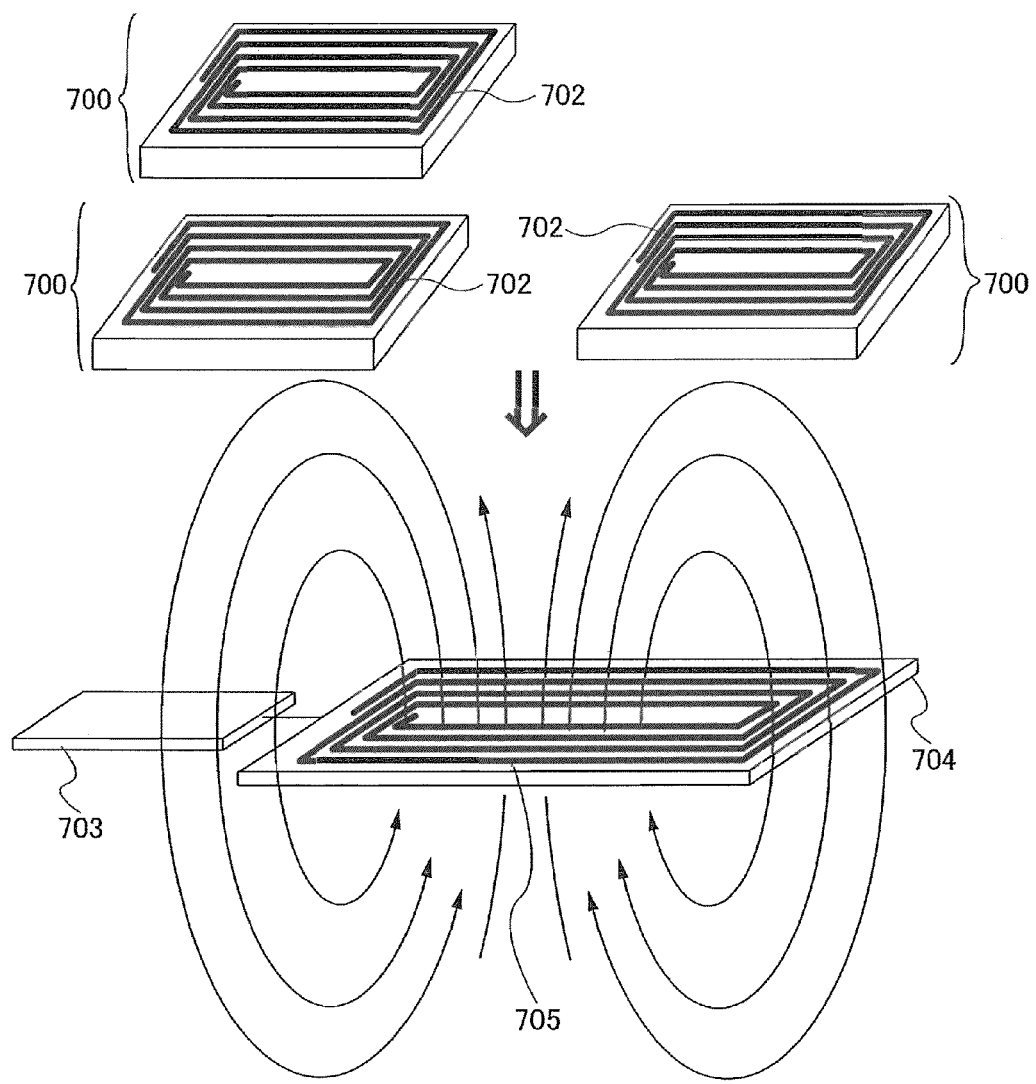
FIG. 7 shows a structure of a power receiving device of Embodiment Mode 1.

In a structure shown in FIG. 6, when a coiled antenna 705 that is connected to an antenna circuit 704 of the power feeder, which is connected to a power transmission control portion 703, is brought close to an antenna circuit 702 of a power receiving device portion 700, an alternating current magnetic field is generated from the coiled antenna 705 of the antenna circuit 704 in the power feeder. The alternating current magnetic field goes through the antenna circuit 702 inside the power receiving device portion 700, and an electromotive force is generated between terminals (between one terminal of the antenna and the other) of the antenna circuit 702 inside the power receiving device portion 700 by electromagnetic induction. A battery inside the power receiving device portion 700 can be charged by the electromotive force. Note that charging can be conducted from the power feeder even when antenna circuits 702 in the power receiving device portion 700 overlap one another, or when a plurality of antenna circuits 702 in the power receiving device portion 700 are in the alternating current magnetic field, as shown in FIG. 7.

Note that a frequency of a signal transmitted to the antenna circuit 102 from the power feeder 201 can be, for example, 300 GHz to 3 THz, which is a submillimeter wave, 30 GHz to 300 GHz, which is a millimeter wave, 3 GHz to 30 GHz, which is a microwave, 300 MHz to 3 GHz, which is an ultrahigh frequency wave, 30 MHz to 300 MHz, which is a very high frequency wave, 3 MHz to 30 MHz, which is a high frequency wave, 300 kHz to 3 MHz, which is a medium frequency wave, 30 kHz to 300 kHz, which is a low frequency wave, or 3 kHz to 30 kHz, which is a very low frequency wave.

An example of the power supply circuit in FIGS. 1 and 2 will be described, with reference to FIG. 8. The power supply circuit includes a voltage reference circuit and a buffer amplifier. The voltage reference circuit includes a resistor 1001 and diode-connected transistors 1002 and 1003, and generates a reference voltage, which is the sum of the $V_{GS}$ (the voltage between the gate and the source) of the transistor 1002 and the $V_{GS}$ of the transistor 1003. The buffer amplifier includes a differential circuit that includes transistors 1005 and 1006, a current mirror circuit that includes transistors 1007 and 1008, and a common source amplifier that includes a current supply resistor 1004, a transistor 1009, and a resistor 1010.

Figure 8:
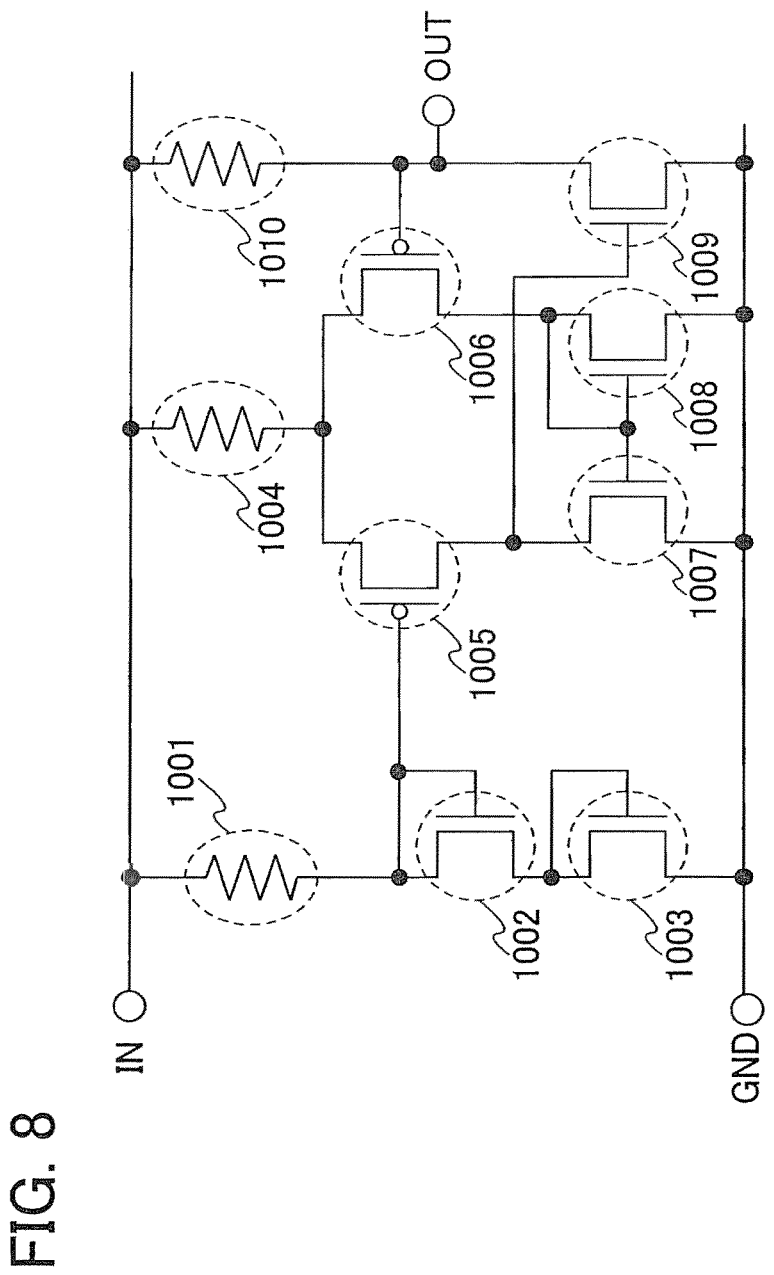
FIG. 8 shows a structure of a power receiving device of Embodiment Mode 1.

In the power supply circuit shown in FIG. 8, when a large amount of current flows from an output terminal, the amount of current that flows through the transistor 1009 becomes small, whereas when a small amount of current flows from the output terminal, the amount of current that flows through the transistor 1009 becomes large, and the amount of current that flows through the resistor 1010 is almost constant. Further, the potential of the output terminal becomes almost the same as that of the voltage reference circuit. In this embodiment mode, a power supply circuit having a voltage reference circuit and a buffer amplifier is described; however, a power supply circuit used in the invention is not limited to the configuration in FIG. 8, and a power supply circuit with a different configuration may be used.

Note that 'battery' as referred to in this specification means a battery whose continuous operating time can be restored by charging. Further, as a battery, preferably a battery formed in a sheet-like form is used, although the type of battery used may differ depending on the intended use of the device. For example, by using a lithium battery, preferably a lithium polymer battery that uses a gel electrolyte, a lithium ion battery, or the like, miniaturization is possible. Of course, any battery may be used, as long as it is chargeable. A battery that can be charged and that can discharge electricity, such as a nickel metal hydride battery, a nickel cadmium battery, an organic radical battery, a lead-acid battery, an air secondary battery, a nickel-zinc battery, or a silver-zinc battery may be used. Alternatively, a high-capacity capacitor or the like may be used.

Next, an operation of charging electric power to the movable electronic device 100 shown in FIGS. 1 and 2 from the power feeder 201 by radio signals is described. A radio signal received by the antenna circuit is half-wave rectified and then smoothed by the rectifier circuit 106. The voltage that has been half-wave rectified and smoothed by the rectifier circuit 106 is stored temporarily in the battery 104. The electric power stored in the battery 104 is used as electric power that is supplied to the power supply circuit 108.

Figure 29:
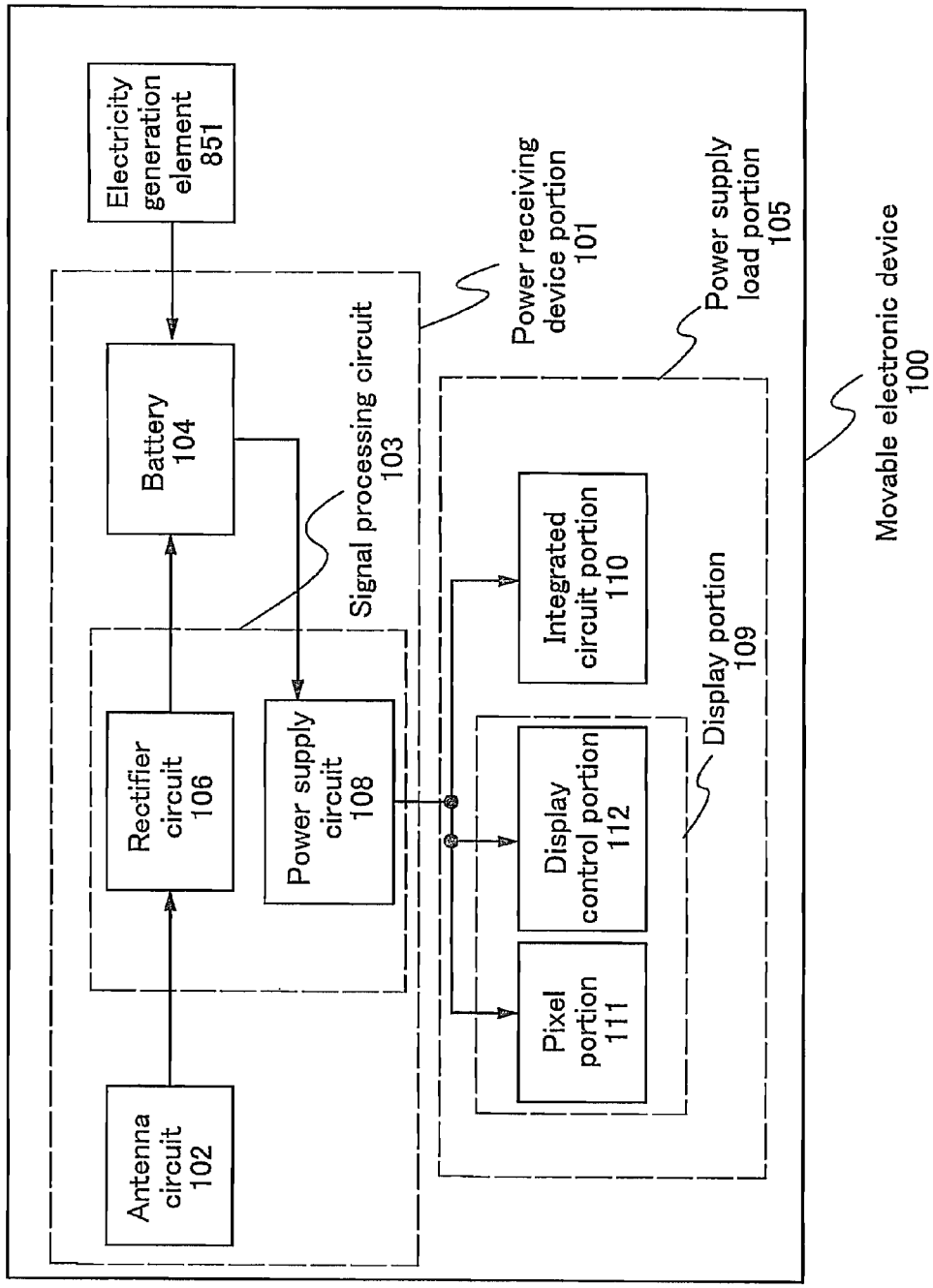
FIG. 29 shows a structure of a power receiving device of Embodiment Mode 1.

Note that in this embodiment mode, electric power that is stored in the battery is not limited to being a radio signal output from the power feeder 201. A structure in which an electricity generation element is separately supplementarily provided in a section of a movable electronic device may also be employed. FIG. 29 shows a structure in which an electricity generation element is provided. The structure in FIG. 29 differs from that in FIG. 1 in that an electricity generation element 851 for supplying electric power to the battery is provided. Employing the structure in which the electricity generation element 851 is provided is advantageous because the amount of electric power supplied for storage in the battery 104 can be increased and the charging rate can be increased. Note that as the electricity generation element 851 in FIG. 29, for example, an electricity generation element employing a solar cell, an electricity generation element employing a piezoelectric element, or an electricity generation element employing a micro electro mechanical system (MEMS) may be used. Of course, a supply of electric power from a generator employing motive power of a combustion engine such as a motor vehicle engine may be used instead of a supply of electric power from the electricity generation element. Employing the structure in which both the generator are provided is advantageous because the amount of electric power supplied for storage in the battery can be increased and the charging rate can be increased. Note that the structure of the electricity generation element in FIG. 29 is not limited to the structures described above.

Next, the electric power supplied from the battery 104 to the power supply circuit 108 is supplied to the pixel portion 111 and the display control portion 112 in the display portion 109 and to the integrated circuit portion 110, which are in the power supply load portion 105 in the structures shown in FIGS. 1 and 2. Thereby, the movable electronic device can be operated.

As described above, a power receiving device of the invention has an antenna circuit. Therefore, it is not necessary to provide a relay terminal as a portion which conducts electricity to the battery in a movable electronic device, and power can be supplied to the battery by a radio signal without malfunctions caused by damage to or defects in a relay terminal. In addition, since a power supply means for conducting power supply supplies power to a movable electronic device having a battery that is a charging device by radio, as long as radio receiving conditions are good, charging can be conducted anytime, without the need for carrying a charger or a primary cell for charging.

Note that this embodiment mode can be implemented by being combined with other embodiment modes in this specification.

Embodiment Mode 2

In this embodiment mode, a structure in which a booster antenna circuit (hereinafter referred to as a booster antenna) is included in the structure of the movable electronic device equipped with a power receiving device shown in Embodiment Mode 1 is explained, with reference to drawings. Note that in the drawings used in this embodiment mode, for parts that are the same as those in Embodiment Mode 1, the same numbers as those in Embodiment Mode 1 are used.

Note that the booster antenna described in this embodiment mode refers to an antenna having a larger size than that of the antenna provided in the power receiving device which receives signals from the power feeder. The booster antenna refers to an antenna that can efficiently transmit a signal that is supplied from the power feeder to the destination of the signal, the power receiving device, by resonating the signal from the power feeder at a frequency band that is used and magnetically coupling the antenna circuit provided in the power receiving device with the booster antenna itself by a magnetic field. Since the booster antenna is magnetically coupled to the antenna circuit by the magnetic field, there is no need to directly connect the antenna circuit and the signal processing circuit, which is advantageous.

A structure of a movable electronic device having a power receiving device of this embodiment mode will be described with reference to the block diagrams of FIGS. 9 and 10.

Figure 9:
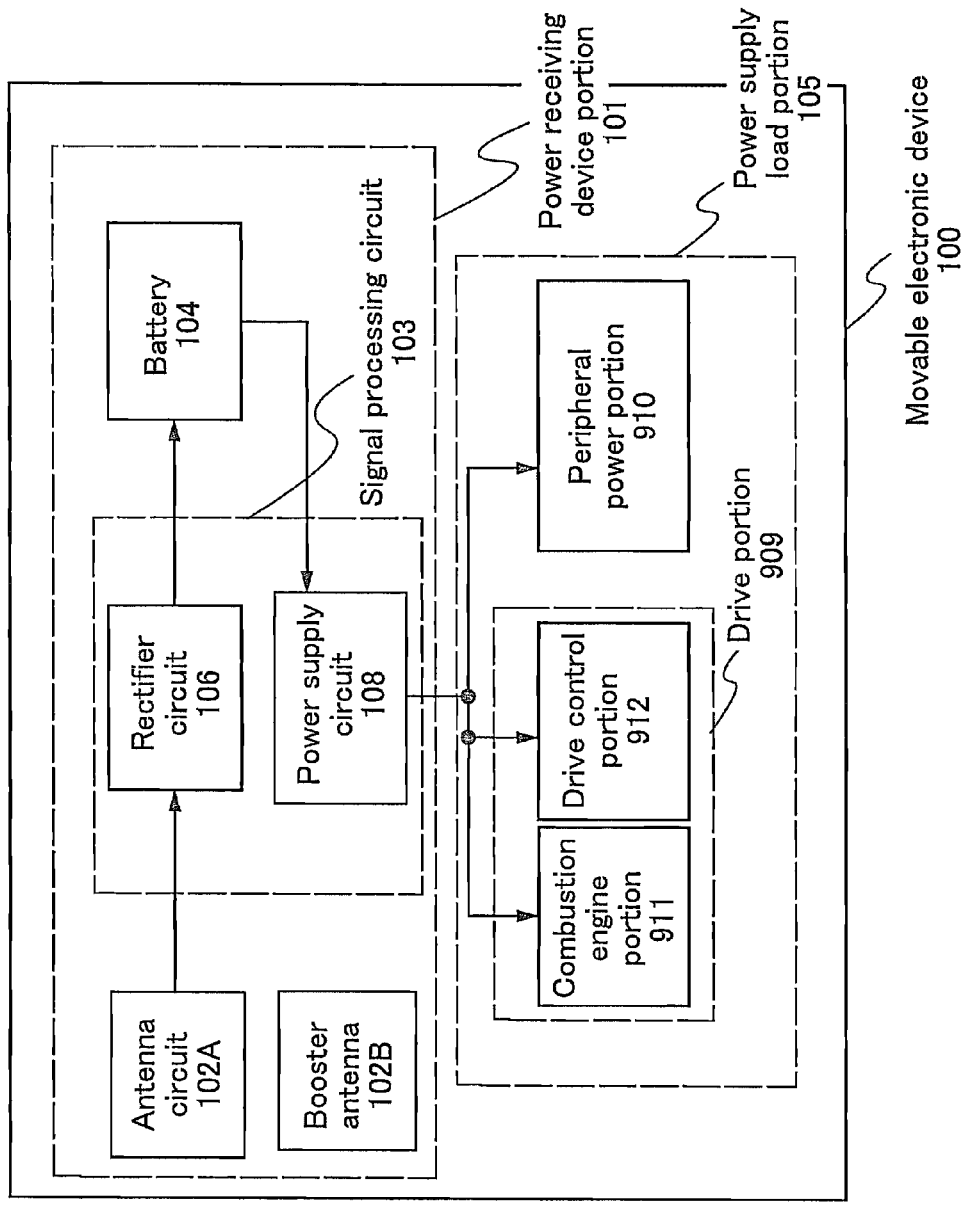
FIG. 9 shows a structure of a power receiving device of Embodiment Mode 2.

The movable electronic device 100 in FIG. 9 includes the power receiving device portion 101 and the power supply load portion 105. The power receiving device portion includes an antenna circuit 102A, a booster antenna 102B, the signal processing circuit 103, and a battery 104. The signal processing circuit 103 includes a rectifier circuit 106 and a power supply circuit 108.

Note that the power supply circuit 108 in FIG. 9 supplies electric power to the power supply load portion 105. However, since the configuration of the power supply load portion 105 differs from movable electronic device to movable electronic device, in this embodiment mode, description is made assuming the structure is that of a motor vehicle (the term 'motor vehicle' includes two-wheeled motor vehicles and the like). Accordingly, the power supply circuit 108 supplies power to a drive portion 909 and a peripheral power portion 910. Note that the peripheral power portion 910 is a circuit portion which processes signals other than those of the drive portion, and since its configuration can be different in different motor vehicles, which are movable electronic devices, it will not be explained in detail in this specification. The drive portion 909 includes a combustion engine portion 911 and a drive control portion 912 for controlling the combustion engine portion 911. The combustion engine portion 911 includes a spark plug for starting up a combustion engine. The spark plug is electrically connected the signal processing circuit 103.

Figure 10:
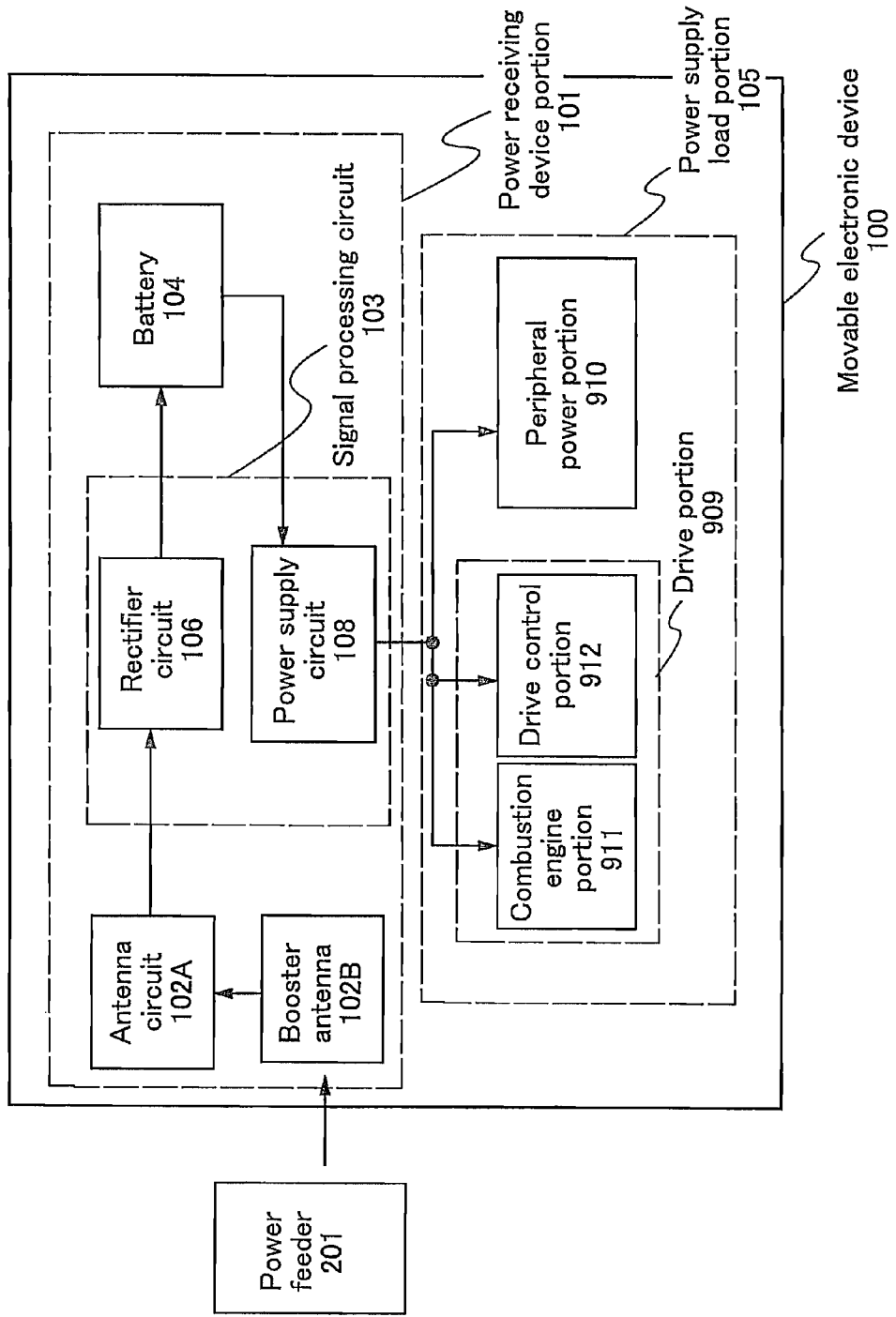
FIG. 10 shows a structure of a power receiving device of Embodiment Mode 2.

FIG. 10 is a block diagram showing a configuration in which the antenna circuit 102A receives a radio signal from a power feeder 201. In FIG. 10, the booster antenna 102B receives a radio signal from the power feeder, upon which electromagnetic induction occurs, joining the booster antenna 102B with the antenna circuit 102A by a magnetic field. Thereby, the electric power received by the antenna circuit 102A is input to the battery 104 via the rectifier circuit 106. From the battery 104, a suitable amount of electric power is supplied to the power supply circuit 108. By employing the structure in FIG. 10, the distance between the power feeder 201 and the power receiving device portion 101 when transmitting electric power by radio signals can be increased, which is advantageous.

Note that there is no particular limitation on the form of the antennas in the antenna circuit 102A and the booster antenna 102B. For example, an antenna with one of the structures shown in FIGS. 3A to 3E, described in Embodiment Mode 1, may be employed. However, due to functional considerations, for the booster antenna it is preferable to employ an antenna with a form larger than that of the antenna circuit with which the booster antenna links through a magnetic field. Further, concerning the antenna circuit 102A and the booster antenna 102B, as in FIG. 4A described in Embodiment Mode 1, they are described as being formed by the antenna 401 and the resonant capacitor 402, and the combination of the antenna 401 and the resonant capacitor 402 is referred to as 'antenna circuit 403'.

Further, the rectifier circuit 106 in FIGS. 9 and 10 is the same as the rectifier circuit described in Embodiment Mode 1. As shown in FIG. 4B, a rectifier circuit 407 may be formed by a diode 404, a diode 405, and a smoothing capacitor 406.

Note that the power feeder 201 in FIGS. 9 and 10 is similar to the power feeder described in Embodiment Mode 1, and may have the structure shown in FIG. 5.

Figure 11:
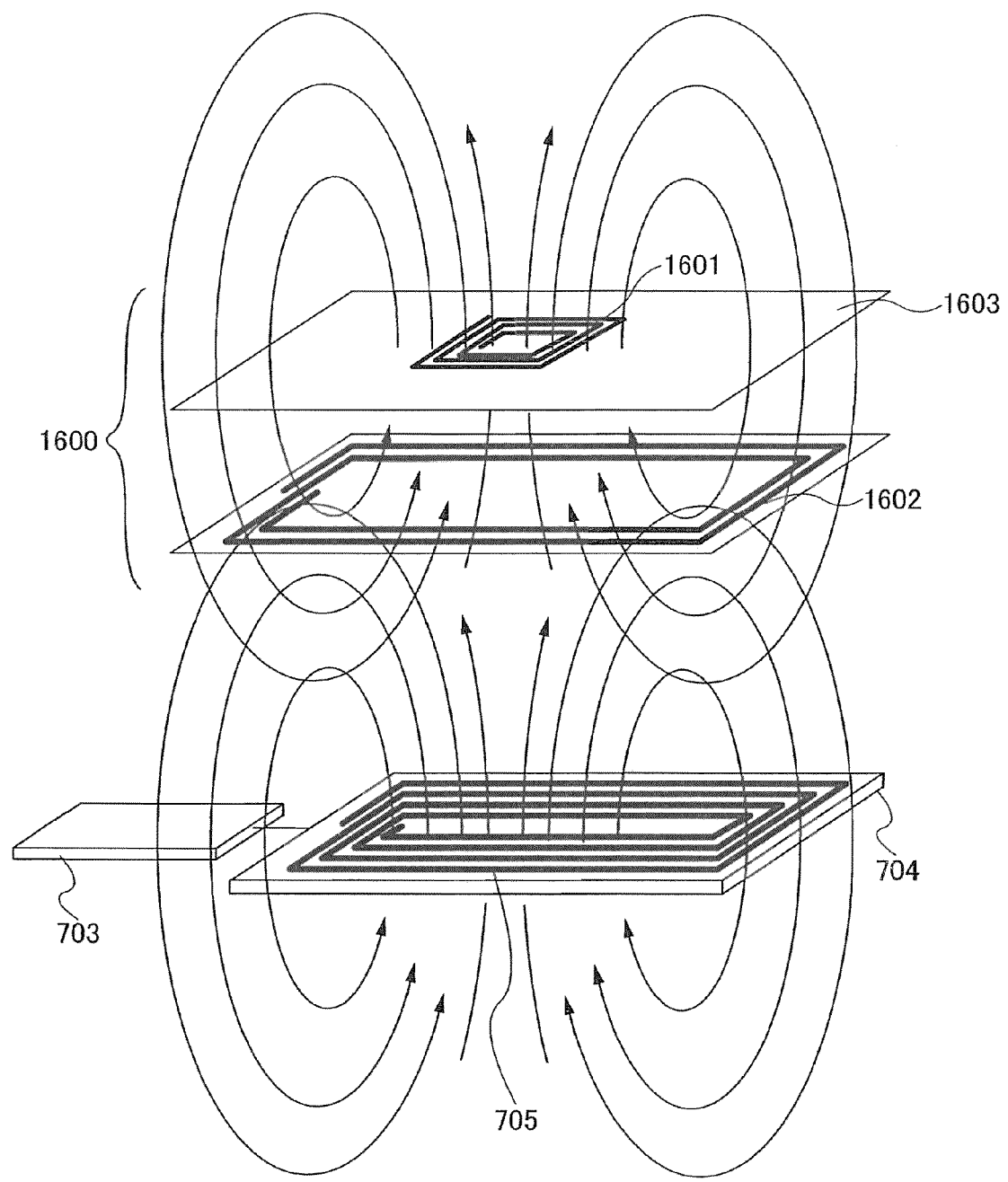
FIG. 11 shows a structure of a power receiving device of Embodiment Mode 2.

Further, in this embodiment mode, a radio signal that is for the antenna circuit 102A and the booster antenna 102B to receive is exchanged by an electromagnetic induction method. Therefore, the power receiving device portion 101 in FIGS. 9 and 10 has a structure which includes the coiled antenna circuit 102A and the booster antenna 102B. For example, in FIG. 11, a positional relationship between the power feeder in the power receiving device portion having the antenna circuit and the booster antenna, and the forms of the antennas are shown. In FIG. 11, a structure is shown in which the booster antenna in the power receiving device portion receives a radio signal from the power feeder, and the antenna circuit receives an electromagnetic wave via magnetic coupling with the booster antenna.

In FIG. 11, a structure is shown in which when a coiled antenna 705 that is connected to an antenna circuit 704 of the power feeder which is connected to a power transmission control portion 703, is brought close to a booster antenna 1602 of a power receiving device portion 1600, an alternating current magnetic field is generated from the coiled antenna 705 of the antenna circuit 704 in the power feeder. The alternating current magnetic field goes through the booster antenna 1602 inside the power receiving device portion 1600, and an electromotive force is generated between terminals (between one terminal of the antenna and the other) of the coiled booster antenna 1602 inside the power receiving device portion 1600 by electromagnetic induction. When the electromotive force is generated by electromagnetic induction in the coiled booster antenna 1602, an alternating current magnetic field is generated from the coiled booster antenna 1602 itself. Then, the alternating current magnetic field generated from the booster antenna 1602 goes through the antenna 1601 connected to the antenna circuit 1603 in the power receiving device portion 1600, and due to electromagnetic induction, an electromotive force is generated between terminals (between one terminal of the antenna and the other) of the coiled antenna 1601 in the power receiving device portion 1600. The battery in the power receiving device portion 1600 can be charged by this electromotive force.

Further, concerning the power receiving device portion 101 shown in FIGS. 9 and 10, charging from the charger can be conducted even in a case where power receiving portions overlap, as shown in FIG. 7 in Embodiment Mode 1.

Note that since the frequencies of the signals supplied to the antenna circuit 102A from the power feeder 201 are the same as those in Embodiment Mode 1, description of them is omitted here.

Since the power supply circuit 108 in FIGS. 9 and 10 is the same as the example shown in FIG. 8 in Embodiment Mode 1, it will not be described here.

Next, an operation of charging electric power to the battery 104 of the movable electronic device 100 shown in FIGS. 9 and 10 using a radio signal from the power feeder 201 will be described. A radio signal received by the antenna circuit 102A undergoes half-wave rectification and is then smoothed by the rectifier circuit 106. The voltage that has been half-wave rectified and smoothed by the rectifier circuit 106 is stored temporarily in the battery 104. The electric power stored in the battery 104 is used as electric power that is supplied to the power supply circuit 108.

Figure 12:
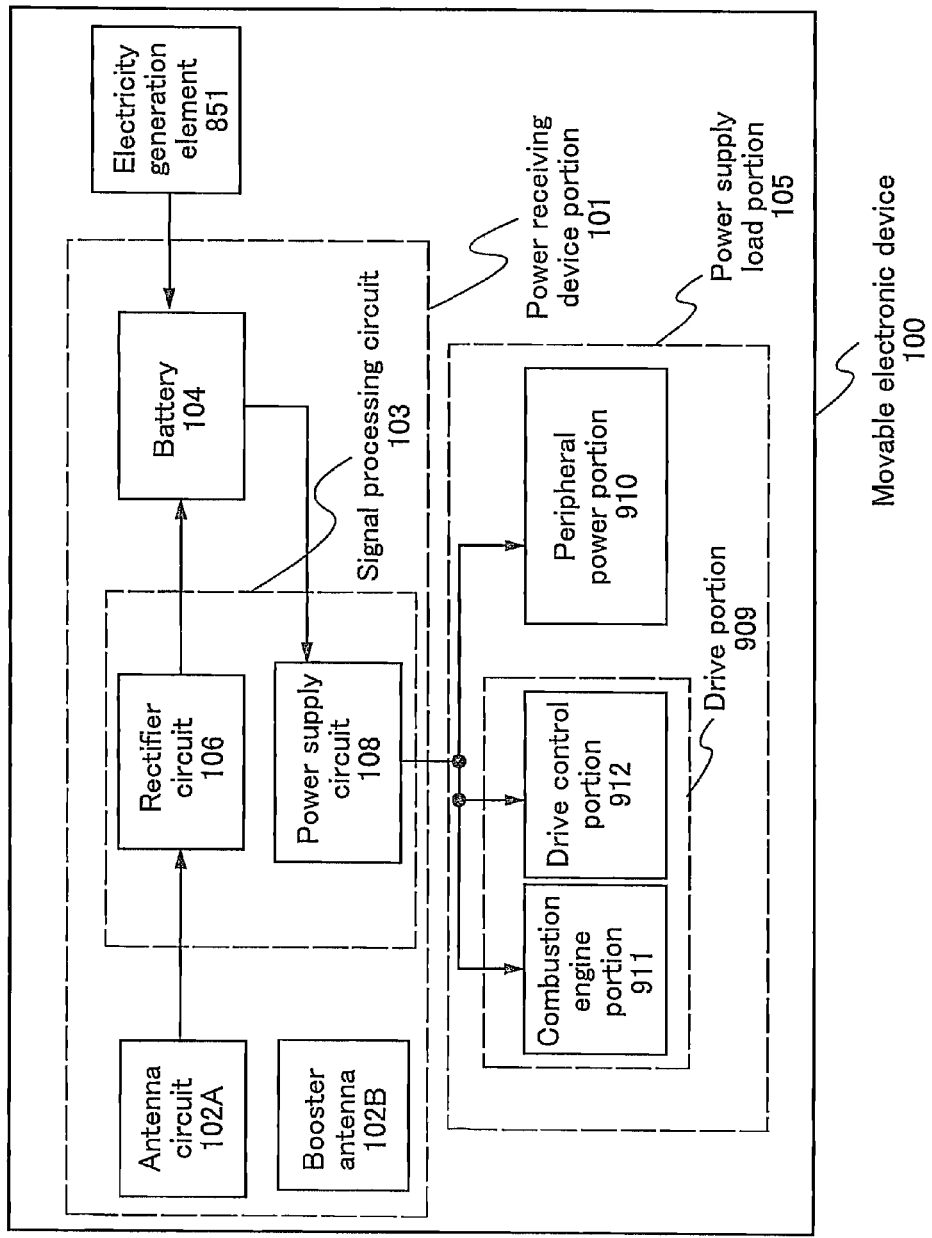
FIG. 12 shows a structure of a power receiving device of Embodiment Mode 2.

Note that in this embodiment mode, electric power stored in the battery is not limited to a signal that is output from the power feeder 201. A structure in which an electricity generation element is supplementarily provided in a section of a movable electronic device may also be employed. FIG. 12 shows a structure in which an electricity generation element is provided. The structure in FIG. 12 differs from that in FIG. 9 in that an electricity generation element 851 for supplying electric power to the battery 104 is provided. Employing the structure in which the electricity generation element 851 is provided is advantageous because the amount of electric power supplied for storage in the battery 104 can be increased and the charging rate can be increased.

Note that as the electricity generation element 851 in FIG. 12, for example, an electricity generation element employing a solar cell, an electricity generation element employing a piezoelectric element, or an electricity generation element employing a micro electro mechanical system (MEMS) may be used. Of course, a supply of electric power from generator employing motive power of a combustion engine such as a motor vehicle engine may be used instead of a supply of electric power from the electricity generation element. Employing the structure in which both the generator are provided is advantageous because the amount of electric power supplied for storage in the battery can be increased and the charging rate can be increased. Note that the structure of the electricity generation element in FIG. 12 is not limited to the structures described above.

Next, the electric power supplied from the battery 104 to the power supply circuit 108 is supplied to the combustion engine portion 911 and the drive control portion 912 in the drive portion 909 and to the peripheral power portion 910, which are in the power supply load portion 105 in the structures shown in FIGS. 9 and 10. The combustion engine portion 911 includes a spark plug for starting up a combustion engine. The spark plug is electrically connected the power supply circuit 108. Ignition of a spark plug by electric power charged to the battery 104 start up the combustion engine.

As described above, a power receiving device of the invention has an antenna circuit. Therefore, it is not necessary to provide a relay terminal as a portion which conducts electricity to the battery in a movable electronic device, and power can be supplied to the battery by a radio signal without malfunctions caused by damage to or defects in a relay terminal.

Further, in the structure of this embodiment mode, a booster antenna is included in the structure of Embodiment Mode 1. Therefore, the structure in this embodiment mode has advantages such as the fact that supply of electric power from the power feeder to the power receiving device can be conducted even more reliably.

In the structure of this embodiment mode, when charging a battery of a motor vehicle or the like which is a power receiving device, since power supply can be conducted wirelessly, batteries are not connected by a cable. Therefore, the safety and convenience of charging the battery of a motor vehicle or the like which is a power receiving device can be improved.

Note that this embodiment mode can be implemented by being combined with other embodiment modes in this specification.

Embodiment Mode 3

In this embodiment mode, an example of a manufacturing method of a power receiving device described in a previous embodiment mode will be described, with reference to drawings. In this embodiment mode, as the movable electronic device described in Embodiment Mode 1, a portable telephone or a digital video camera is assumed, and a structure in which an antenna circuit, a signal processing circuit and a battery are provided over the same substrate is described. Note that by forming the antenna circuit, the signal processing circuit and the battery over the same substrate and using thin film transistors as transistors that form the signal processing circuit, miniaturization can be achieved, which is advantageous.

Note that in this embodiment mode, concerning the antenna circuit described in Embodiment Modes 1 and 2, only its form and position will be described, so it will be referred to as simply an 'antenna'.

Figure 13A:
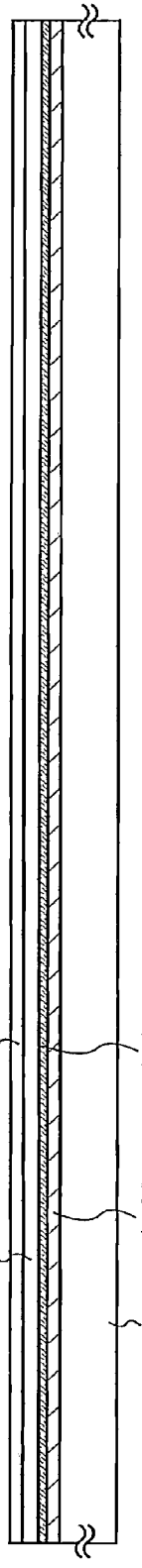
FIGS. 13A to 13D show a manufacturing method of a power receiving device of Embodiment Mode 3.

First, over a surface of a substrate 1301, a release layer 1303 is formed with an insulating film 1302 interposed therebetween. Next, an insulating film 1304 which serves as a base film and a semiconductor film 1305 (for example, a film including amorphous silicon) are formed (refer to FIG. 13A). Note that the insulating film 1302, the release layer 1303, the insulating film 1304, and the amorphous semiconductor film 1305 may be formed consecutively.

The substrate 1301 may be a glass substrate, a quartz substrate, a metal substrate (such as a stainless steel substrate), a ceramic substrate, a semiconductor substrate such as a Si substrate, or the like. Alternatively, as a plastic substrate, a substrate formed of polyethylene terephthalate (PET), polyethylene naphthalate (PEN), polyether sulfone (PES), acrylic, or the like can be used. Note that in this process, the release layer 1303 is provided over an entire surface of the substrate 1301 with the insulating film 1302 interposed therebetween. However, if necessary, the release layer 1303 may be selectively provided, by using a photolithography method after providing the release layer over an entire surface of the substrate 1301.

The insulating film 1302 and the insulating film 1304 are formed by a CVD method, a sputtering method, or the like, using an insulating material such as silicon oxide, silicon nitride, silicon oxynitride ($SiO_xN_y$, where x>y>0), or silicon nitride oxide ($SiN_xO_y$, where x>y>0). For example, if the insulating films 1302 and 1304 have a two-layer structure, a silicon nitride oxide film may be formed as a first insulating film and a silicon oxynitride film may be formed as a second insulating film. Alternatively, a silicon nitride film may be formed as a first insulating film and a silicon oxide film may be formed as a second insulating film. The insulating film 1302 serves as a blocking layer that prevents an impurity element from the substrate 1301 from getting mixed with the release layer 1303 or with an element formed above the release layer 1303, and the insulating film 1304 serves as a blocking layer that prevents an impurity element from the substrate 1301 or the release layer 1303 from getting mixed with an element fowled above the release layer 1303. By forming the insulating films 1302 and 1304 serving as blocking layers in this manner, an alkali metal such as Na or an alkaline earth metal from the substrate 1301 and an impurity element contained in the release layer 1303 can be prevented from adversely affecting an element foamed above the insulating films. Note that in a case such as when quartz is used as the substrate 1301, the insulating films 1302 and 1304 may be omitted from the structure.

As the release layer 1303, a metal film, a layered structure including a metal film and a metal oxide film, or the like can be used. The metal film is formed from a single layer or a stack of layers of a film of an element selected from among tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or of an alloy material or a compound material containing an above-mentioned element as its main component. Further, such materials can be formed by a sputtering method, by various CVD methods, such as a plasma CVD method, or the like. As the layered structure of a metal film and a metal oxide film, after forming the above-described metal film, oxide or oxynitride of the metal film can be provided on the surface of the metal film by conducting plasma treatment in an oxygen atmosphere or an $N_2O$ atmosphere, or heat treatment in an oxygen atmosphere or an $N_2O$ atmosphere. For example, in a case where a tungsten film is provided as the metal film by a sputtering method, a CVD method, or the like, by performing plasma treatment to the tungsten film, a metal oxide film formed of tungsten oxide can be formed on the surface of the tungsten film. In this case, an oxide of tungsten is expressed as $WO_x$, where x is 2 to 3, and there are cases where x is 2 ($WO_2$), cases where x is 2.5 ($W_2O_5$), cases where x is 2.75 ($W_4O_{11}$), cases where x is 3 ($WO_3$), and the like. When forming the oxide of tungsten, there is no particular limitation on the value of x, and which oxide is to be formed may be determined according to an etching rate or the like. Alternatively, for example, after forming a metal film (for example, tungsten), an insulating film of silicon oxide ($SiO_2$) or the like may be provided over the metal film by a sputtering method, and a metal oxide is formed over the metal film (for example, tungsten oxide over tungsten). In addition, as plasma treatment, the above-described high-density plasma treatment may be performed, for example. Further, besides the metal oxide film, a metal nitride or a metal oxynitride may also be used. In such a case, the metal film may be subjected to a plasma treatment or a heat treatment in a nitrogen atmosphere or an atmosphere of nitrogen and oxygen.

The amorphous semiconductor film 1305 is formed to a thickness of 25 to 200 nm (preferably 30 to 150 nm) by a sputtering method, an LPCVD method, a plasma CVD method, or the like.

Figure 13B:
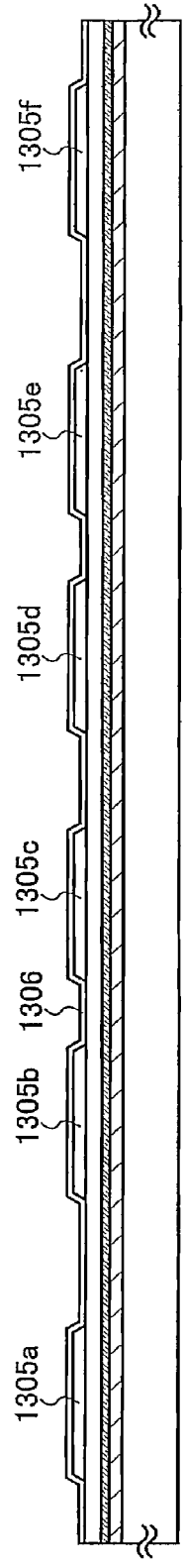

Next, the amorphous semiconductor film 1305 is crystallized by laser light irradiation. The amorphous semiconductor film 1305 may be crystallized by a method in which a laser irradiation method is combined with a thermal crystallization method using RTA or an annealing furnace or a thermal crystallization method using a metal element that promotes crystallization, or the like. Subsequently, the obtained crystalline semiconductor film is etched to a desired shape, forming crystalline semiconductor films 1305a to 1305f. A gate insulating film 1306 is then formed so as to cover the semiconductor films 1305a to 1305f (refer to FIG. 13B).

The gate insulating film 1306 is formed by a CVD method, a sputtering method, or the like, using an insulating material such as silicon oxide, silicon nitride, silicon oxynitride ($SiO_xN_y$, where x>y>0), or silicon nitride oxide ($SiN_xO_y$, where x>y>0). For example, if the gate insulating film 1306 has a two-layer structure, a silicon oxynitride film may be formed as a first insulating film and a silicon nitride oxide film may be formed as a second insulating film. Alternatively, a silicon oxide film may be formed as a first insulating film and a silicon nitride film may be formed as a second insulating film.

An example of a manufacturing process of the crystalline semiconductor films 1305a to 1305f will be briefly described below. First, an amorphous semiconductor film with a thickness of 50 to 60 nm is formed by a plasma CVD method. Next, a solution containing nickel, which is a metal element that promotes crystallization, is retained on the amorphous semiconductor film, and the amorphous semiconductor film undergoes dehydrogenation treatment (at 500° C., for one hour) and thermal crystallization treatment (at 550° C., for four hours). Thereby, a crystalline semiconductor film is fainted. Subsequently, by irradiating the crystalline semiconductor film with laser light and a using a photolithography method, the crystalline semiconductor films 1305a to 1305f are formed. Note that alternatively, the amorphous semiconductor film may be crystallized only by laser light irradiation, without conducting thermal crystallization using a metal element that promotes crystallization.

As a laser oscillator which is used for crystallization, a continuous wave laser beam (a CW laser beam) or a pulsed wave laser beam (a pulsed laser beam) can be used. As a laser beam which can be used, a laser beam emitted from one or more of the following can be used: a gas laser such as an Ar laser, a Kr laser, or an excimer laser; a laser of which the medium is single crystal YAG; $YVO_4$, forsterite ($Mg_2SiO_4$), $YAlO_3$, $GdVO_4$, or polycrystalline (ceramic) YAG, $Y_2O_3$, $YVO_4$, $YAlO_3$, or $GdVO_4$, to which one or more of Nd, Yb, Cr, Ti, Ho, Er, Tm and Ta is added as a dopant; a glass laser; a ruby laser; an alexandrite laser; a Ti:sapphire laser; a copper vapor laser; or a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:$YVO_4$ laser (fundamental wave of 1064 nm) can be used. An energy density of the laser at this time is required to be approximately 0.01 to 100 MW/cm$^2$ (preferably, 0.1 to 10 MW/cm$^2$). Irradiation is conducted with a scanning rate of about 10 to 2000 cm/sec. Note that a laser using, as a medium, single crystal YAG; $YVO_4$, forsterite ($Mg_2SiO_4$), $YAlO_3$, or $GdVO_4$, or polycrystalline (ceramic) YAG; $Y_2O_3$, $YVO_4$, $YAlO_3$, or $GdVO_4$, to which one or more of Nd, Yb, Cr, Ti, Ho, Er, Tm, and Ta is added as a dopant; an Ar ion laser; or a Ti:sapphire laser can be continuously oscillated. Furthermore, pulse oscillation thereof can be performed with a repetition rate of 10 MHz or more by carrying out a Q-switch operation, mode locking, or the like. In the case where a laser beam is oscillated with a repetition rate of 10 MHz or more, after a semiconductor film is melted by laser and before it solidifies, the semiconductor film is irradiated with a next pulse. Therefore, unlike the case of using a pulsed laser with a low repetition rate, a solid-liquid interface can be continuously moved in the semiconductor film, so that crystal grains that have grown continuously in a scanning direction can be obtained.

Further, the gate insulating film 1306 may be formed by conducting the high-density plasma treatment described above on the semiconductor films 1305a to 1305f to oxidize or nitride the surfaces. For example, the film is formed by plasma treatment using a mixed gas containing a rare gas such as He, Ar, Kr or Xe, and oxygen, nitrogen oxide ($NO_2$), ammonia, nitrogen, hydrogen, or the like. When excitation of the plasma in this case is performed by introduction of a microwave, high density plasma can be generated with a low electron temperature. The surface of the semiconductor film can be oxidized or nitrided by an oxygen radical (there are cases where an OH radical is included) or a nitrogen radical (there are cases where an NH radical is included) generated by this high-density plasma.

By treatment using such high-density plasma, an insulating film with a thickness of 1 to 20 nm, typically 5 to 10 nm, is formed over the semiconductor film. Since the reaction in this case is a solid-phase reaction, interface state density between the insulating film and the semiconductor film can be made very low. Since such high-density plasma treatment oxidizes (or nitrides) a semiconductor film (crystalline silicon, or polycrystalline silicon) directly, the insulating film can be formed with very little unevenness in its thickness. In addition, since oxidation is not conducted strongly even at a crystal grain boundary of crystalline silicon, very favorable conditions result. That is, by a solid-phase oxidation of the surface of the semiconductor film by the high-density plasma treatment shown here, an insulating film with good uniformity and low interface state density can be formed without excessive oxidation at a crystal grain boundary.

As the gate insulating film, an insulating film formed by the high-density plasma treatment may be used by itself, or an insulating film of silicon oxide, silicon oxynitride, silicon nitride, or the like may be formed thereover by a CVD method using plasma or thermal reaction, so as to make stacked layers. In any case, when transistors include an insulating film formed by high-density plasma in a part of the gate insulating film or in the whole of the gate insulating film, unevenness in characteristics can be reduced.

Furthermore, in the semiconductor films 1305a to 1305f obtained by irradiating a semiconductor film with a continuous wave laser beam or a laser beam oscillated with a repetition rate of 10 MHz or more and scanning the semiconductor film in one direction to crystallize the semiconductor film, the crystal grows in the scanning direction of the beam. When a transistor is disposed so that the scanning direction is aligned with the channel length direction (the direction in which a carrier flows when a channel formation region is formed) and the above-described gate insulating layer is used, thin film transistors (TFTs) with less variation in characteristics and high electron field-effect mobility can be obtained.

Next, a first conductive film and a second conductive film are stacked over the gate insulating film 1306. In this embodiment mode, the first conductive film is formed to a thickness of 20 to 100 nm by a CVD method, a sputtering method, or the like. The second conductive film is formed to a thickness of 100 to 400 nm. The first conductive film and the second conductive film are formed using an element selected from among tantalum (Ta), tungsten (W), titanium (Ti), molybdenum (Mo), aluminum (Al), copper (Cu), chromium (Cr), niobium (Nb), or the like, or using an alloy material or a compound material containing one of the above-mentioned elements as its main component. Alternatively, they are Mimed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in the case of using a three-layer structure instead of a two-layer structure, a stacked-layer structure including a molybdenum film, an aluminum film, and a molybdenum film may be used.

Next, a resist mask is formed using a photolithography method, and etching treatment for forming a gate electrode and a gate line is conducted, forming gate electrodes 1307 over the semiconductor films 1305a to 1305f. In this embodiment mode, an example in which the gate electrodes 1307 have a stacked-layer structure including a first conductive film 1307a and a second conductive film 1307b is described.

Figure 13C:
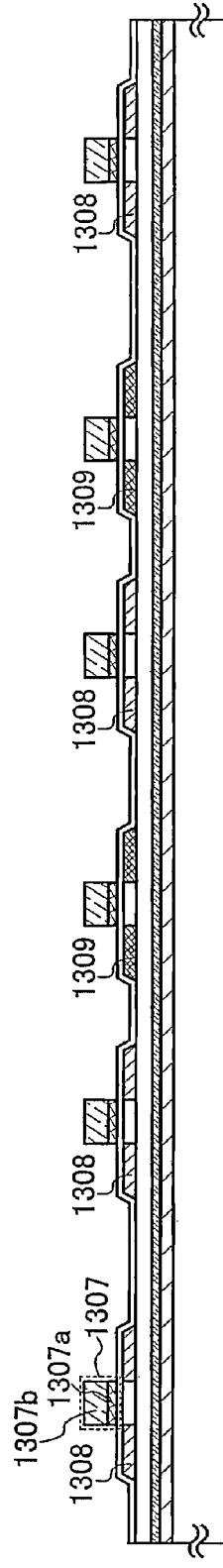

Next, the gate electrodes 1307 are used as masks, and an impurity element imparting n-type conductivity is added to the semiconductor films 1305a to 1305f at a low concentration by an ion doping method or an ion implantation method. Then, a mask formed of resist is selectively formed by a photolithography method, and an impurity element imparting p-type conductivity is added at a high concentration to the semiconductor films 1305a to 1305f. As an impurity element which exhibits n-type conductivity, phosphorus (P), arsenic (As), or the like can be used. As an impurity element which exhibits p-type conductivity, boron (B), aluminum (Al), gallium (Ga), or the like can be used. Here, phosphorus (P) is used as an impurity element imparting n-type conductivity, and is selectively introduced into the semiconductor films 1305a to 1305f such that they contain phosphorus (P) at a concentration of $1\times10^{15}$ to $1\times10^{19}/cm^3$. Thus, n-type impurity regions 1308 are formed. Further, boron (B) is used as an impurity element imparting p-type conductivity, and is selectively introduced into the semiconductor films 1305c and 1305e such that they contain boron (B) at a concentration of $1\times10^{19}$ to $1\times10^{20}/cm^3$. Thus, p-type impurity regions 1309 are fowled (refer to FIG. 13C).

Next, an insulating film is formed so as to cover the gate insulating film 1306 and the gate electrodes 1307. The insulating film is formed as a single layer or stacked layers of a film containing an inorganic material such as silicon, an oxide of silicon, or a nitride of silicon, or an organic material such as an organic resin, by a plasma CVD method, a sputtering method, or the like. Next, the insulating film is selectively etched by anisotropic etching, which etches mainly in a vertical direction, forming insulating films 1310 (also referred to as side walls) which are in contact with side surfaces of the gate electrodes 1307. The insulating films 1310 are used as masks for doping when LDD (lightly doped drain) regions are formed.

Next, using a resist mask formed by a photolithography method, the gate electrodes 1307, and the insulating films 1310 as masks, an impurity element imparting n-type conductivity is added at a high concentration to the semiconductor films 1305a, 1305b, 1305d, and 1305f to form n-type impurity regions 1311. Here, phosphorus (P) is used as an impurity element imparting n-type conductivity, and is selectively introduced into the semiconductor films 1305a, 1305b, 1305d, and 1305f such that they contain phosphorus (P) at a concentration of $1\times10^{19}$ to $1\times10^{20}/cm^3$. Thus the n-type impurity regions 1311, which have a higher concentration than the impurity regions 1308, are formed.

Figure 13D:
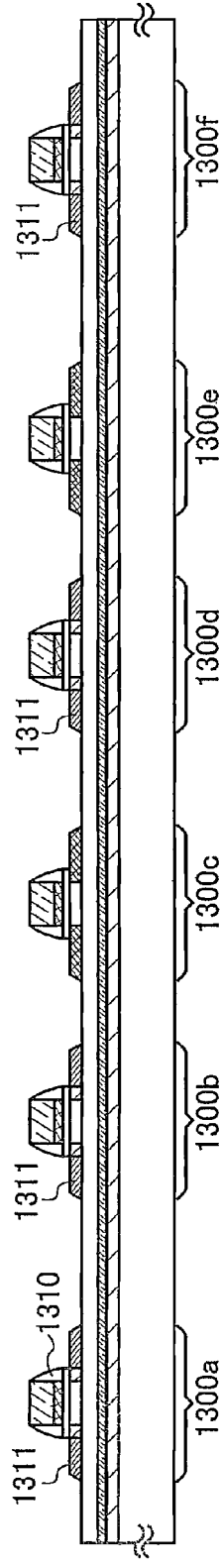

N-channel thin film transistors 1300a, 1300b, 1300d, and 1300f, and p-channel thin film transistors 1300c and 1300e are formed by the above-described steps (refer to FIG. 13D).

Note that in the n-channel thin film transistor 1300a, a channel formation region is formed in a region of the semiconductor film 1305a which overlaps with the gate electrode 1307; the impurity regions 1311 which each form a source region or a drain region are formed in regions of the semiconductor film 1305a which do not overlap with the gate electrode 1307 and the insulating films 1310; and lightly doped drain regions (LDD regions) are formed in regions of the semiconductor film 1305a which overlap with the insulating films 1310 and are between the channel formation region and the impurity regions 1311. In addition, the n-channel thin film transistors 1300b, 1300d, and 1300f are similarly provided with channel formation regions, lightly doped drain regions, and impurity regions 1311.

In the p-channel thin film transistor 1300c, a channel formation region is formed in a region of the semiconductor film 1305c which overlaps with the gate electrode 1307, and the impurity regions 1309 which each form a source region or a drain region are formed in regions of the semiconductor film 1305c which do not overlap with the gate electrode 1307. Further, the p-channel thin film transistor 1300e is similarly provided with a channel formation region and impurity regions 1309. Note that the p-channel thin film transistors 1300c and 1300e are not provided with LDD regions here; however, the p-channel thin film transistor may be provided with an LDD region, and the n-channel thin film transistor is not necessarily provided with an LDD region.

Next, an insulating film is formed in a single layer or stacked layers so as to cover the semiconductor films 1305a to 1305f, the gate electrodes 1307, and the like; thereby forming conductive films 1313, which are electrically connected to the impurity regions 1309 and 1311 which form the source regions or the drain regions of the thin film transistors 1300a to 1300f, over the insulating film (refer to FIG. 14A). The insulating film is formed in a single layer or stacked layers, using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like. Here, the insulating film has a two-layer structure. A silicon nitride oxide film is formed as a first insulating film 1312a, and a silicon oxynitride film is formed as a second insulating film 1312b. Further, the conductive films 1313 can form source electrodes and drain electrodes of the thin film transistors 1300a to 1300f.

Note that before the insulating films 1312a and 1312b are formed or after one or more of thin films of the insulating films 1312a and 1312b are formed, heat treatment may be conducted for recovering the crystallinity of the semiconductor film, for activating an impurity element which has been added into the semiconductor film, or for hydrogenating the semiconductor film. As the heat treatment, thermal annealing, a laser annealing method, an RTA method, or the like may be used.

The conductive films 1313 are formed in a single layer or stacked layers, using an element selected from among aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material containing one of the above-mentioned elements as its main component, by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both of carbon and silicon. The conductive films 1313 preferably employ, for example, a stacked-layer structure including a barrier film, an aluminum-silicon (Al—Si) film and a barrier film, or a stacked-layer structure including a barrier film, an aluminum-silicon (Al—Si) film, a titanium nitride (TiN) film, and a barrier film. Note that a barrier film corresponds to a thin film formed from titanium, a nitride of titanium, molybdenum, or a nitride of molybdenum. Aluminum and aluminum silicon, which have low resistance and are inexpensive, are ideal materials for forming the conductive films 1313. Further, generation of a hillock of aluminum or aluminum silicon can be prevented when upper and lower barrier layers are formed. Furthermore, when the barrier film is formed from titanium, which is a highly-reducible element, even if a thin natural oxide film is fowled over the crystalline semiconductor film, the natural oxide film is chemically reduced, so good contact with the crystalline semiconductor film can be obtained.

Next, an insulating film 1314 is formed so as to cover the conductive films 1313, and over the insulating film 1314 are formed conductive films 1315a and 1315b, which electrically connect to the conductive films 1313 which each form a source electrode or a drain electrode of the thin film transistors 1300a and 1300f. Further, a conductive film 1316 is formed which electrically connects to the conductive films 1313 which each form a source electrode or a drain electrode of the thin film transistor 1300b. Note that the conductive films 1315a and 1315b may be formed of the same material at the same time as the conductive film 1316. The conductive films 1315a and 1315b and the conductive film 1316 can be formed using any of the materials that the conductive films 1313 can be formed of, mentioned above.

Next, a conductive film 1317 which functions as an antenna is formed so as to be electrically connected to the conductive film 1316 (refer to FIG. 14B).

Note that the insulating film 1314 can be provided by a CVD method, a sputtering method, or the like, and can have a single-layer structure including an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); or an organic material such as epoxy, polyimide, polyamide, polyvinyl phenol, benzocyclobutene, or acrylic; or a siloxane material such as a siloxane resin. Alternatively, the insulating film 1314 may have a stacked structure including the above-mentioned materials. Note that the siloxane material corresponds to a material having an Si—O—Si bond. Siloxane has a skeletal structure formed from a bond of silicon (Si) and oxygen (O). As a substituent, an organic group containing at least hydrogen (for example, an alkyl group or aromatic hydrocarbon) is used. A fluoro group can also be used as a substituent. Alternatively, an organic group containing at least hydrogen and a fluoro group may be used as a substituent.

The conductive film 1317 is formed of a conductive material, using a CVD method, a sputtering method, a printing method such as a screen printing method or a gravure printing method, a droplet discharge method, a dispensing method, a plating method, or the like. The conductive material is an element selected from among aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing one of the above-mentioned elements as its main component. The conductive film is formed with a single-layer structure or a stacked-layer structure.

For example, in the case of using a screen printing method to form the conductive film 1317 which functions as an antenna, the conductive film 1317 can be provided by selectively printing a conductive paste in which conductive particles having a grain size of several nm to several tens of μm are dissolved or dispersed in an organic resin. As the conductive particles, metal particles of one or more of any of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersive nanoparticles can be used. In addition, as the organic resin included in the conductive paste, one or more organic resins selected from among organic resins which function as a binder, a solvent, a dispersing agent, or a coating material for the metal particles can be used. An organic resin such as an epoxy resin or a silicon resin can be given as representative examples. Further, when the conductive film is formed, it is preferable to conduct baking after the conductive paste is applied. For example, in the case of using fine particles containing silver as a main component (e.g., the grain size is in the range of 1 nm to 100 nm, inclusive) as a material for the conductive paste, the conductive film can be obtained by curing by baking at a temperature in the range of 150 to 300° C. Alternatively, fine particles containing solder or lead-free solder as a main component may be used. In that case, preferably, fine particles having a grain size of 20 μm or less are used. Solder or lead-free solder has advantages such as low cost.

In addition, each of the conductive films 1315a and 1315b can function as a wiring which is electrically connected to a battery included in a power receiving device of this embodiment mode in a subsequent process. In addition, when the conductive film 1317 which functions as an antenna is formed, another conductive film may be separately formed so as to be electrically connected to the conductive films 1315a and 1315b, and that conductive film may be used as a wiring connected to the battery.

Next, after an insulating film 1318 is formed so as to cover the conductive film 1317, a layer (hereinafter referred to as an 'element formation layer 1319') including the thin film transistors 1300a to 1300f, the conductive film 1317, and the like, is peeled off the substrate 1301. Here, openings are formed in regions where the thin film transistors 1300a to 1300f are not formed by laser light (e.g., UV light) irradiation (refer to FIG. 14C), and then, the element formation layer 1319 can be peeled off the substrate 1301 using physical force. Alternatively, before the element formation layer 1319 is peeled off the substrate 1301, an etchant may be introduced into the formed openings to selectively remove the release layer 1303. As the etchant, a gas or liquid containing halogen fluoride or an interhalogen compound is used. For example, chlorine trifluoride ($ClF_3$) is used as a gas containing halogen fluoride. Accordingly, the element formation layer 1319 is peeled off the substrate 1301. Note that the release layer 1303 may be partially left instead of being removed entirely. By leaving a part of the release layer 1303, consumption of the etchant and treatment time required for removing the release layer can be reduced. In addition, the element formation layer 1319 can be left over the substrate 1301 even after the release layer 1303 is removed. Further, by reusing the substrate 1301 after the element formation layer 1319 is peeled off, cost can be reduced.

The insulating film 1318 can be formed using a CVD method, a sputtering method, or the like, to have a single-layer structure of an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); an organic material such as epoxy, polyimide, polyamide, polyvinyl phenol, benzocyclobutene, or acrylic; or a siloxane material such as a siloxane resin. Alternatively, the insulating film 1318 can have a stacked-layer structure including one or more of the above-mentioned films.

In this embodiment mode, after the openings are formed in the element formation layer 1319 by laser light irradiation, a first sheet material 1320 is attached to one surface of the element formation layer 1319 (a surface where the insulating film 1318 is exposed), and then, the element formation layer 1319 is peeled off the substrate 1301 (refer to FIG. 15A).

Next, a second sheet material 1321 is attached to the other surface of the element formation layer 1319 (a surface exposed by peeling) by conducting one or both of heat treatment and pressure treatment (refer to FIG. 15B). As the first sheet material 1320 and the second sheet material 1321, a hot-melt film or the like can be used.

As the first sheet material 1320 and the second sheet material 1321, a film on which antistatic treatment for preventing static electricity or the like has been performed (hereinafter referred to as an antistatic film) can be used. Examples of the antistatic film are a film in which a material that can prevent electrostatic charge is dispersed in a resin, a film to which a material that can prevent electrostatic charge is attached, and the like. The film provided with a material that can prevent electrostatic charge may be a film with a material that can prevent electrostatic charge provided over one of its surfaces, or a film with a material that can prevent electrostatic charge provided over each of its surfaces. Concerning the film with a material that can prevent electrostatic charge provided over one of its surfaces, the film may be attached to the layer so that the material that can prevent electrostatic charge is placed on the inner side of the film or the outer side of the film. The material that can prevent electrostatic charge may be provided over an entire surface of the film, or over a part of the film. As a material that can prevent electrostatic charge, a metal, indium tin oxide (ITO), or a surfactant such as an amphoteric surfactant, a cationic surfactant, or a nonionic surfactant can be used. In addition to that, as an antistatic material, a resin material containing a cross-linked copolymer having a carboxyl group and a quaternary ammonium base on its side chain, or the like can be used. By attaching, mixing, or applying such a material to a film, an antistatic film can be formed. By conducting sealing using the antistatic film, the extent to which a semiconductor element is affected by static electricity from outside and the like when dealt with as a commercial product can be reduced.

Note that the battery is formed so as to be connected to the conductive films 1315a and 1315b. However, the connection with the battery may be performed before the element formation layer 1319 is peeled off the substrate 1301 (in a step at a stage shown in FIG. 14B or FIG. 14C), or after the element formation layer 1319 is peeled off the substrate 1301 (in a step at a stage shown in FIG. 15A), or after the element formation layer 1319 is sealed with the first sheet material and the second sheet material (in a step at a stage shown in FIG. 15B). An example in which the element formation layer 1319 and the battery are formed so as to be connected is described below with reference to FIGS. 16A to 17B.

In FIG. 14B, conductive films 1331a and 1331b, which are electrically connected to the conductive films 1315a and 1315b, respectively, are formed at the same time as the conductive film 1317 which functions as an antenna. Next, the insulating film 1318 is formed so as to cover the conductive film 1317 and the conductive films 1331a and 1331b. Then, openings 1332a and 1332b are formed so as to expose surfaces of the conductive films 1331a and 1331b. Then, after openings are formed in the element formation layer 1319 by laser light irradiation, the first sheet material 1320 is attached to one surface of the element formation layer 1319 (the surface where the insulating film 1318 is exposed), and then, the element formation layer 1319 is peeled off the substrate 1301 (refer to FIG. 16A).

Next, the second sheet material 1321 is attached to the other surface (a surface exposed by peeling) of the element formation layer 1319, and the element formation layer 1319 is then peeled off the first sheet material 1320. Accordingly, in this embodiment mode, a sheet material with weak adhesion is used as the first sheet material 1320. Then, conductive films 1334a and 1334b, which are electrically connected to the conductive films 1331a and 1331b through the openings 1332a and 1332b, respectively, are selectively formed (refer to FIG. 16B).

The conductive films 1334a and 1334b are formed of a conductive material, using a CVD method, a sputtering method, a printing method such as a screen printing method or a gravure printing method, a droplet discharge method, a dispensing method, a plating method, or the like. The conductive material is an element selected from among aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing one of the above-mentioned elements as its main component. The conductive films are formed with a single-layer structure or a stacked-layer structure.

Note that in this embodiment mode, an example is shown in which the element formation layer 1319 is peeled off the substrate 1301 before the conductive films 1334a and 1334b are formed. However, the element formation layer 1319 may be peeled off the substrate 1301 after the conductive films 1334a and 1334b are formed.

Next, in the case where a plurality of elements is formed over the substrate, the element formation layer 1319 is separated into different elements. (refer to FIG. 17A). A laser irradiation apparatus, a dicing apparatus, a scribing apparatus, or the like can be used for the separation. Here, the plurality of elements formed over one substrate are separated from one another by laser light irradiation.

Next, the separated element is electrically connected to connecting terminals of the battery (refer to FIG. 17B). Here, conductive films 1336a and 1336b provided on the substrate 1335 which serve as connecting terminals of the battery are connected to the conductive films 1334a and 1334b provided over the element formation layer 1319, respectively. A case is shown in which the conductive film 1334a and the conductive film 1336a, or the conductive film 1334b and the conductive film 1336b, are pressure-bonded to each other with a material having an adhesive property such as an anisotropic conductive film (an ACF) or an anisotropic conductive paste (an ACP) interposed therebetween, so as to be electrically connected to each other. An example is shown in which conductive particles 1338 contained in a resin 1337 having an adhesive property are used for connection. In addition, connection can be conducted using a conductive adhesive agent such as a silver paste, a copper paste, or a carbon paste, or using solder bonding, or the like.

In a case where the battery is larger than the element, by forming a plurality of elements over one substrate, as shown in FIGS. 16A to 17B, separating the elements, then connecting the elements to the battery, the number of elements which can be formed over one substrate can be increased. Accordingly, a power receiving device can be formed at low cost.

Subsequently, a booster antenna may be provided, as described in the previous embodiment mode 2.

Note that this embodiment mode can be implemented by being freely combined with any of the above-described embodiment modes.

Embodiment Mode 4

In this embodiment mode, an example of a manufacturing method of a power receiving device which differs from the above embodiment mode will be described, with reference to drawings. In this embodiment mode, it is assumed that the movable electronic device mentioned in Embodiment Mode 1 is a portable telephone or a digital video camera, and a structure in which the antenna circuit, the signal processing circuit, and the battery are provided over the same substrate is described. Note that by forming the antenna circuit, the signal processing circuit, and the battery over the same substrate and using thin film transistors as the transistors which form the signal processing circuit, miniaturization can be achieved, which is advantageous.

Note that in this embodiment mode, only the form and position of the antenna circuit described in Embodiment Modes 1 and 2 will be described, so it will be referred to as simply an 'antenna'.

Figure 18A:
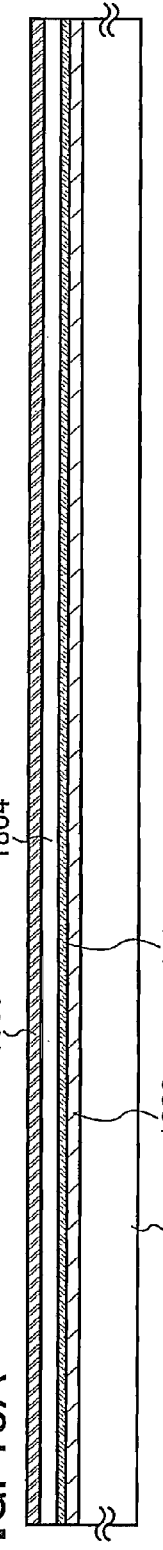
FIGS. 18A to 18D show a manufacturing method of a power receiving device of Embodiment Mode 4.

First, a release layer 1803 is formed over one surface of a substrate 1801, with an insulating film 1802 interposed therebetween. Then, an insulating film 1804 which functions as a base film and a conductive film 1805 are stacked thereover (refer to FIG. 18A). Note that the insulating film 1802, the release layer 1803, the insulating film 1804, and the conductive film 1805 can be formed consecutively.

The conductive film 1805 is formed as a single layer or stacked layers of a film formed of an element selected from among tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or of an alloy material or a compound material containing an above-mentioned element as its main component. The conductive film can be formed by a sputtering method, various CVD methods such as a plasma CVD method, or the like, using these materials.

The substrate 1801, the insulating film 1802, the release layer 1803, and the insulating film 1804 can be formed using any material that can be used for the substrate 1301, the insulating film 1302, the release layer 1303, and the insulating film 1304, respectively, described in the previous embodiment mode.

Figure 18B:
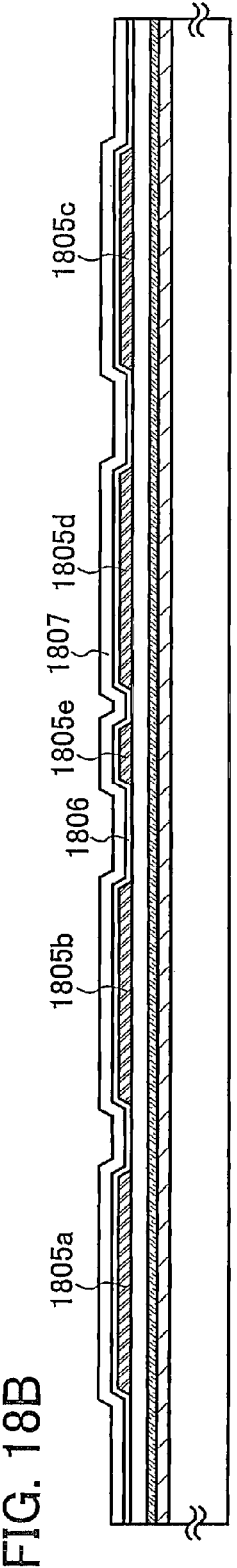

Next, the conductive film 1805 is selectively etched to form conductive films 1805a to 1805e, and insulating films 1806 and 1807 are stacked so as to cover the conductive films 1805a to 1805e (refer to FIG. 18B).

The insulating films 1806 and 1807 are faulted with an insulating material such as silicon oxide, silicon nitride, silicon oxynitride ($SiO_xN_y$, where x>y>0), or silicon nitride oxide ($SiN_xO_y$, where x>y>0), using a CVD method, a sputtering method, or the like. For example, silicon nitride oxide can be used to form the insulating film 1806 and silicon oxynitride can be used to form the insulating film 1807. Further, although an example in which two insulating films are stacked is described here, just the insulating film 1806 or the insulating film 1807 may be provided, or three or more insulating films may be stacked.

Figure 18C:
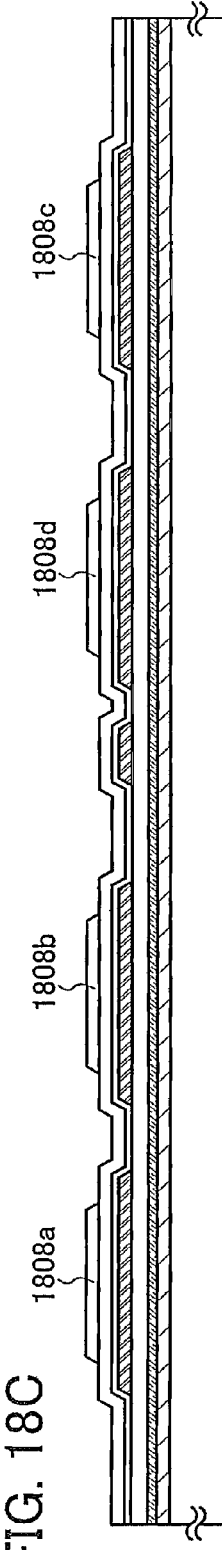

Next, semiconductor films 1808a to 1808d are selectively formed over the conductive films 1805a to 1805d, respectively (refer to FIG. 18C). Here, an amorphous semiconductor film (for example an amorphous silicon film) is formed to a thickness of 25 to 200 nm (preferably, to a thickness of 30 to 150 nm) over the insulating film 1807, by a sputtering method, an LPCVD method, a plasma CVD method, or the like, and the amorphous semiconductor film is crystallized. Then, etching is conducted selectively to form the semiconductor films 1808a to 1808d. For a material of the semiconductor film, a crystallization method thereof, or the like, the materials and method described in the previous embodiment mode can be used. Further, the insulating films 1806 and 1807 and the amorphous semiconductor film can be formed consecutively.

Figure 21A:
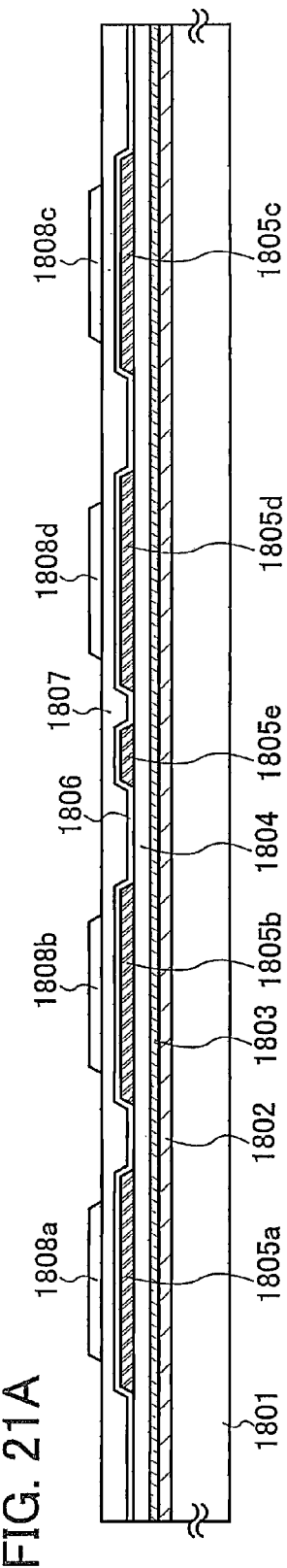
FIGS. 21A and 21B show a manufacturing method of a power receiving device of Embodiment Mode 4.

Note that in a case where a surface of the insulating film 1807 has unevenness due to the conductive films 1805a to 1805d, it is preferable to conduct a planarization process on the insulating film 1807 to flatten its surface before forming the amorphous semiconductor film over the insulating film 1807. As the planarization process, a polishing process such as a CMP method can be used. As shown in FIG. 21A, by performing a polishing process such as a CMP method, a semiconductor film can be formed over the insulating film 1807 with a flattened surface. Therefore, when elements are formed using the semiconductor films 1808a to 1808d, the extent to which characteristics of the elements are adversely affected can be reduced.

Next, a gate insulating film 1809 is formed so as to cover the semiconductor films 1808a to 1808d, and gate electrodes 1810 are selectively formed over the semiconductor films 1808a to 1808c. Then, an impurity element is added to the semiconductor films 1808a to 1808d to form impurity regions 1811, using the gate electrodes 1810 as masks (refer to FIG. 18D). An example is shown in which the gate electrodes 1810 have a stacked structure including a first conductive film 1810a and a second conductive film 1810b. As an impurity element, an impurity element imparting n-type conductivity or p-type conductivity is added to the semiconductor films 1808a to 1808d. As an impurity element which exhibits n-type conductivity, phosphorus (P), arsenic (As), or the like can be used. As an impurity element which exhibits p-type conductivity, boron (B), aluminum (Al), gallium (Ga), or the like can be used. In this embodiment mode, phosphorus (P), which is an impurity element imparting n-type conductivity, is introduced into the semiconductor films 1808a to 1808d, such that they contain phosphorus (P) at a concentration of $1\times10^{19}$ to $1\times10^{20}/cm^3$, to form the n-type impurity regions 1811. Note that the invention is not limited to this, and a p-type impurity region may be formed by adding an impurity element imparting p-type conductivity, or impurity elements imparting n-type conductivity and p-type conductivity may be selectively introduced into the semiconductor films 1808a to 1808d.

Figure 18D:
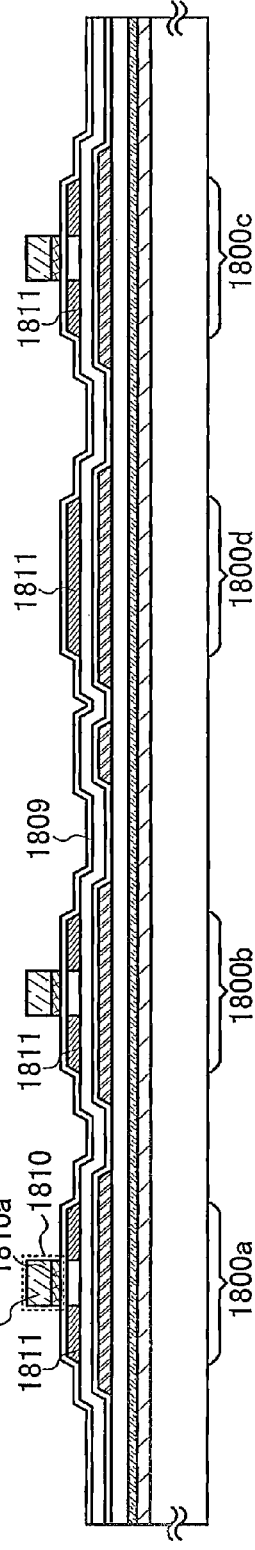

N-channel thin film transistors 1800a to 1800c and an element 1800d which functions as a capacitor can be formed by the above-described steps (refer to FIG. 18D).

In the n-channel thin film transistor 1800a, a channel formation region is formed in a region of the semiconductor film 1808a which overlaps with the gate electrode 1810, and the impurity regions 1811 which each form a source region or a drain region are formed in regions of the semiconductor film 1808a which do not overlap with the gate electrode 1810, adjacent to the channel formation region. Further, each of the n-channel thin film transistors 1800b and 1800c is similarly provided with a channel formation region and impurity regions 1811 which each form a source region or a drain region.

In the element 1800d, a capacitor is formed by a stacked-layer structure including the conductive film 1805d, the insulating films 1806 and 1807, and the impurity region 1811 of the semiconductor film, into which an impurity element has been introduced.

Note that here, an example in which the n-channel thin film transistors 1800a to 1800c are provided is described; however, a p-channel thin film transistor may be provided, or, as shown in the above embodiment mode, insulating films can be provided that are in contact with side surfaces of the gate electrodes 1810, and lightly doped drain regions (LDD regions) can be provided in the semiconductor films 1808a to 1808c.

Figure 21B:
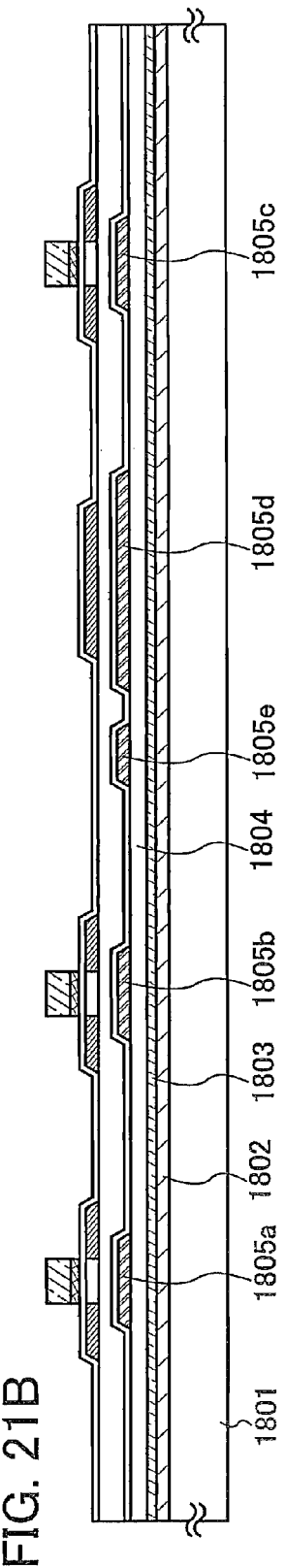

In this embodiment mode, an example is shown in which the conductive films 1805a to 1805c are formed larger than the semiconductor films 1808a to 1808c (the conductive films 1805a to 1805c are formed so as to overlap with the channel formation regions and the impurity regions 1811 of the thin film transistors 1800a to 1800c); however, the invention is not limited to this. For example, the conductive films 1805a to 1805c may be provided so as to overlap with a part of the impurity regions 1811 and the entire surface of the channel formation regions of the thin film transistors 1800a to 1800c (refer to FIG. 21A); or the conductive films 1805a to 1805c may be provided so as to overlap with a part of the impurity regions 1811 and a part of the channel formation regions (refer to FIG. 21B); or the conductive films 1805a to 1805c may be provided so as to overlap with only a part of the channel formation regions. In the case of providing the conductive films 1805a to 1805c in such a manner, it is particularly preferable to conduct a polishing process such as CMP, to flatten the insulating film 1807.

Note that by providing the conductive films 1805a to 1805c, concerning the thin film transistors, prevention of damage and ESD (electrostatic discharge), control of short-channel effects and threshold voltage, reduction in processing steps, and the like are possible.

That is, concerning a power receiving device including the thin film transistors 1800a to 1800c, even if the power receiving device is bent, warping in the channel forming regions and the impurity regions of the thin film transistors 1800a to 1800c can be controlled by the conductive film provided so as to overlap with the channel forming regions and the impurity regions. Therefore, damage of the thin film transistors 1800a to 1800c can be prevented.

Further, when manufacturing the power receiving device, the conductive films 1805a to 1805c serve as escapes for electrical charge or as diffusion regions for electrical charge, so localized accumulation of electrical charge decreases, and electric field concentration can be eased. Therefore, ESD can be prevented.

Further, in the thin film transistors 1800a to 1800c, an adverse effect from the drain to the source is blocked by the conductive films 1805a to 1805c, respectively. Therefore, even if a channel length is shortened, short-channel effects can be controlled. In short, short-channel effect (a phenomenon in which the threshold voltage (value) Vth of a transistor shifts sharply and the recovery of the drain current of a sub-threshold region is blunted, and the like) can be controlled.

Further, the threshold voltage of the thin film transistors 1800a to 1800c can be controlled according to a potential input to the conductive films 1805a to 1805c.

FIG. 24B is a graph showing the relationship between the drain current and the gate voltage of an n-type MOS transistor. It is preferable that in the region where the gate voltage Vg is positive, the drain current Id is sufficiently large, and when the gate voltage Vg is less than or equal to zero, the drain current Id is zero. However, in actual fact, as shown by the curve 2404, concerning the drain current Id, even when the gate voltage Vg is zero, an amount of leakage current equivalent to 'I' flows. The current of each individual transistor is not large, but many transistors are provided in the power receiving device, and when the leakage current of those transistors is combined, the resulting amount is by no means small. Such leakage current increases the standby power consumption of the power receiving device. In other words, it increases the consumption of electric power stored in the battery.

By adding a very small amount of impurity to the channel region of the transistor and shifting the curve shown in FIG. 24B to the right, the leakage current can be reduced. However, there has been a problem in that in such a case, current when the Vg is positive also drops, causing the frequency characteristics of the circuit to deteriorate.

In order to solve the above problem, gate electrodes are provided on both the top side and the bottom side of the semiconductor film that forms the transistors. That is, when a cross-section of the transistor is viewed, the semiconductor film is positioned between a first gate electrode and a second gate electrode. Further, a logic signal is applied to the first gate electrode and a threshold voltage control signal is applied to the second gate electrode, and the threshold voltage of the transistors included in the power receiving device can be varied by the potential of the second gate electrode. In this embodiment mode, the conductive films 1805a to 1805c can be used for the second gate electrodes of the thin film transistors 1800a to 1800c, respectively.

The graph in FIG. 24A shows Id-Vg characteristics of a transistor including a first gate electrode and a second gate electrode. The graph in FIG. 24A shows three kinds of curve: curve 2401, curve 2402, and curve 2403. Curve 2402 shows Id-Vg characteristics for when a positive voltage is applied to the second gate electrode. In such a case, the curve shifts to the left, and more current flows. Curve 2401 shows Id-Vg characteristics for when zero voltage is applied to the second gate electrode. Such a case is the same as for a conventional transistor. Curve 2403 shows Id-Vg characteristics for when a negative voltage is applied to the second gate electrode. In such a case, the curve shifts to the right, it is difficult for current to flow, and leakage current decreases. By providing a threshold voltage control function in the power receiving device of this embodiment mode, and shifting the curve of the Id-Vg characteristics of the transistor, leakage current can be reduced.

Further, by using the conductive film 1805e which is formed at the same time as the conductive films 1805a to 1805c as an antenna, a conductive film 1815 and a conductive film 1816, the manufacture of which is described below, can be omitted.

Next, an insulating film 1812 is formed so as to cover the thin film transistors 1800a to 1800c and the element 1800d. Conductive films 1813 which are electrically connected to the impurity regions 1811 which each form source regions or drain regions of the thin film transistors 1800a to 1800c are formed over the insulating film 1812 (refer to FIG. 19A).

The insulating film 1812 is formed in a single layer or stacked layers using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharge method, a screen printing method, or the like.

The conductive films 1813 can be formed using any material that can be used for the conductive films 1313, described in the previous embodiment mode.

Next, an insulating film 1814 is formed so as to cover the conductive films 1813, and conductive films 1815, which are electrically connected to the conductive films 1813 which form source electrodes or drain electrodes of the thin film transistors 1800a and 1800c, are formed over the insulating film 1814. Then, a conductive film 1816 which functions as an antenna is formed so as to be electrically connected to the conductive film 1815 (refer to FIG. 19B).

Next, after an insulating film 1817 is formed so as to cover the conductive films 1816, a layer including the thin film transistors 1800a to 1800c, the element 1800d, the conductive films 1816, and the like (hereinafter referred to as an 'element formation layer 1820') is peeled off the substrate 1801. As a method of peeling, any of the methods described in the above embodiment mode can be used.

Here, after openings are formed in the element formation layer 1820 by laser light irradiation, a first sheet material 1818 is attached to one surface of the element formation layer 1820 (a surface where the insulating film 1817 is exposed). Then, the element formation layer 1820 is peeled off the substrate 1801 (refer to FIG. 20A).

Next, a second sheet material 1819 is attached to the other surface of the element formation layer 1820 (a surface exposed by peeling) by one or both of heat treatment and pressure treatment. As the first sheet material 1818 and the second sheet material 1819, a hot-melt film or the like can be used.

The power receiving device can be formed by the above-described process (refer to FIG. 20B). Note that in this embodiment mode, the element 1800d, which forms a capacitor, can be used as a battery. In addition, a second battery may be provided separately to the element 1800d. In that case, the second battery can be provided using any of the methods shown in the above embodiment mode 3.

Note that the power receiving device described in this embodiment mode is not limited to this description. For example, the battery or the conductive film which functions as an antenna may be provided below the thin film transistors 1800a to 1800c.

An example in which the battery is provided below the thin film transistors 1800a to 1800c is shown in FIGS. 22A and 22B. Here, an example is described in which a conductive film 1831a is provided so as to be electrically connected to the conductive films 1813 which each function as a source electrode or drain electrode of the thin film transistor 1800b, and the conductive film 1831a and a conductive film 1833a which forms connection wiring of the battery are connected below the element formation layer 1820 (at a surface which is exposed when the element formation layer 1820 is peeled off the substrate 1801). Further, an example is described here in which a thin film transistor is provided instead of the element 1800d which foams a capacitor; a conductive film 1833a is provided so as to be electrically connected to the conductive film 1813 which functions as a source electrode or drain electrode of a thin film transistor; and a conductive film 1831b and the conductive film 1833b which forms connection wiring of the battery are connected below the element formation layer 1820 (at the surface which is exposed when the element formation layer 1820 is peeled off the substrate 1801).

In a case where the battery is provided in such a manner, in FIG. 19A, in order to expose the impurity regions 1811 of the thin film transistors 1800a to 1800c, second openings are formed in the insulating films 1806 and 1807, the gate insulating film 1809, and the insulating film 1812 at the same time as first openings are formed in the gate insulating film 1809 and the insulating film 1812. Further, the conductive films 1813 are provided so as to fill the first openings, and the conductive films 1831a and 1831b are formed so as to fill the second openings. The first openings and the second openings can be formed at the same time. When the first openings are fowled, the semiconductor films 1808a to 1808c function as stoppers, and when the second openings are formed, the release layer 1803 functions as a stopper. Subsequently, as described above, after the conductive film 1816 which functions as an antenna (refer to FIG. 22A) is formed, the element formation layer 1820 is peeled off the substrate 1801.

Then, the conductive films 1833a and 1833b which serve as connection wiring of the battery provided over a substrate 1832 are connected to the conductive films 1831a and 1831b, respectively, which are formed on the exposed surface of the element formation layer 1820 which has been peeled off the substrate 1801 (refer to FIG. 22B). Here, a case is shown where the conductive film 1831a and the conductive film 1833a, or the conductive film 1831b and the conductive film 1833b, are electrically connected by being pressure-bonded to each other using a material having an adhesive property such as an anisotropic conductive film (ACF) or an anisotropic conductive paste (ACP) interposed therebetween. An example is shown in which connection is conducted using conductive particles 1835 contained in a resin 1834 having an adhesive property. Further, connection can be conducted using a conductive adhesive agent such as a silver paste, a copper paste, or a carbon paste, or using solder bonding, or the like.

Note that in this embodiment mode, not only a battery, but also a conductive film which functions as an antenna may be provided below the thin film transistors 1800a to 1800c. FIGS. 23A and 23B show an example in which the battery and the conductive film 1816b which functions as an antenna are provided below the thin film transistors 1800a to 1800c.

Here, an example in described in which a conductive film 1831c is provided so as to be electrically connected to a conductive film 1813 which functions as a source electrode or drain electrode of the thin film transistor 1800c, and the conductive film 1831c and the conductive film 1816b which functions as an antenna are connected below the element formation layer 1820 (at the surface of the element formation layer 1820 which is exposed when the element formation layer 1820 is peeled off the substrate 1801). Further, in the example, the battery is provided in the same manner as that shown in FIGS. 22A and 22B.

In a case where the battery and the conductive film which functions as an antenna are provided in this manner, in FIG. 19A, in order to expose the impurity regions 1811 of the thin film transistors 1800a to 1800c, the second openings are formed in the insulating films 1806 and 1807, the gate insulating film 1809, and the insulating film 1812 at the same time as the first openings are formed in the gate insulating film 1809 and the insulating film 1812; the conductive films 1813 are provided so as to fill the first openings; and the conductive films 1831a, 1831b, and 1831c are formed so as to fill the second openings. The first openings and the second openings can be formed at the same time. When the first openings are faulted, the semiconductor films 1808a to 1808c function as stoppers, and when the second openings are formed, the release layer 1803 functions as a stopper. Subsequently, as described above, after the conductive film 1816 which functions as the antenna is formed (refer to FIG. 23A), the element formation layer 1820 is peeled off the substrate 1801.

Then, the conductive films 1833a and 1833b which are provided over the substrate 1832 and serve as the connection wiring of the battery are connected to the conductive films 1831a and 1831b, respectively, which are formed on the exposed surface of the element formation layer 1820 which has been peeled off the substrate 1801. Further, the conductive film 1831c formed on the exposed surface of the element formation layer 1820 which has been peeled off the substrate 1801 is connected to the conductive film 1816b which is provided over a substrate 1836 and functions as an antenna.

In a case such as this, where the battery or the antenna or both the battery and the antenna are larger size than that of an element such as the thin film transistors 1800a to 1800c or the like, the element formation layer and the battery or the antenna are preferably attached to each other, as shown in FIGS. 22A to 23B. In a case where the battery or the antenna or both the battery and the antenna are larger than the element, by forming a plurality of elements over one substrate, separating the elements, then attaching the elements to the battery and the antenna, the power receiving device can be formed at low cost.

Note that this embodiment mode can be implemented by being freely combined with any of the above-described embodiment modes.

Embodiment 1

In this embodiment, uses of a movable electronic device including a power receiving device of the invention will be described. Examples that can be given of a movable electronic device including a power receiving device of the invention are a portable telephone, a digital video camera, a computer, a portable information terminal (such as a mobile computer, a portable telephone, a portable game machine, or an electronic book), an image reproduction device including a recording medium (specifically, a digital versatile disc, or 'DVD'), and the like. Below, examples will be described with reference to drawings.

Note that in this embodiment, concerning the antenna circuit described in Embodiment Modes 1 and 2, only its form and position will be described, so it will be referred to as simply an 'antenna'.

Figure 25A:
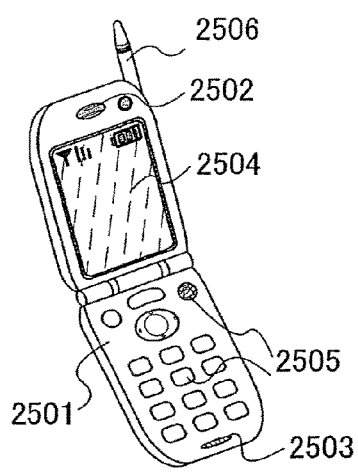
FIGS. 25A to 25F illustrate modes of an embodiment.

FIG. 25A shows an example of a portable telephone that includes a main body 2501, an audio output portion 2502, an audio input portion 2503, a display portion 2504, operation switches 2505, an antenna 2506, and the like. A power receiving device of the invention includes inside the main body 2501a signal processing circuit and a battery, and thus can receive a radio signal from outside the device through the antenna 2506 and charge the battery. Accordingly, when charging the battery, electric power can be supplied to the display of the display portion 2504, and the like without using a battery charger.

Figure 25B:
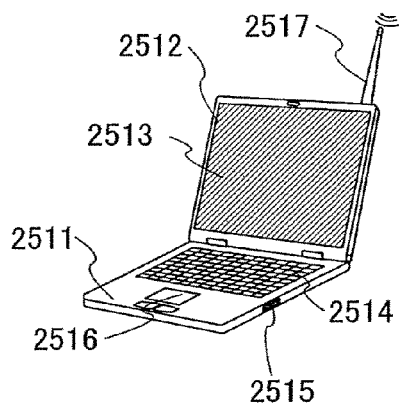

FIG. 25B shows an example of a mobile computer (also known as a notebook computer) that includes a main body 2511, a housing 2512, a display portion 2513, a keyboard 2514, an external connection port 2515, a pointing device 2516, an antenna 2517, and the like. A power receiving device of the invention includes inside the main body 2511 a signal processing circuit and a battery, and thus can receive a radio signal from outside the device through the antenna 2517 and charge the battery. Accordingly, when charging the battery, electric power can be supplied to the display of the display portion 2513, and the like without using a battery charger.

Figure 25C:
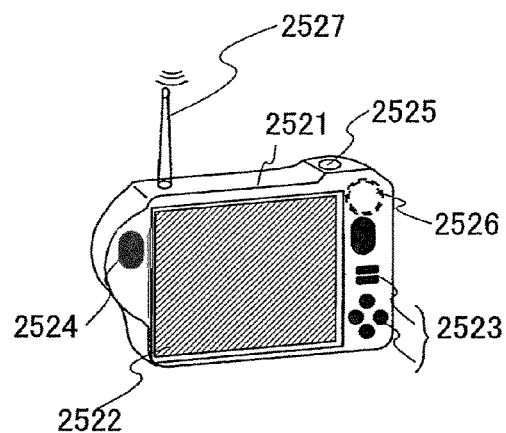

FIG. 25C shows an example of a digital camera that includes a main body 2521, a display portion 2522, operation keys 2523, a speaker 2524, a shutter 2525, an image receiving portion 2526, an antenna 2527, and the like. A power receiving device of the invention includes inside the main body 2521 a signal processing circuit and a battery, and thus can receive a radio signal from outside the device through the antenna 2527 and charge the battery. Accordingly, when charging the battery, electric power can be supplied to the display of the display portion 2522, and the like without using a battery charger.

Figure 25D:
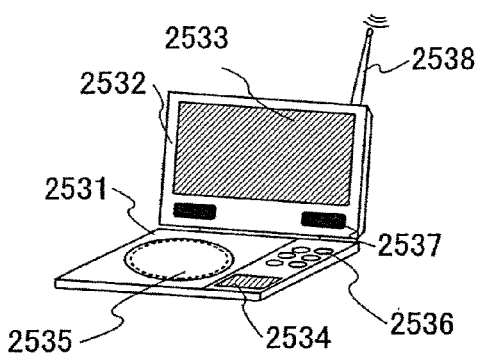

FIG. 25D shows an example of a portable image reproduction device (specifically, a DVD reproduction device) including a recording medium. The portable image reproduction device includes a main body 2531, a housing 2532, a first display portion 2533, a second display portion 2534, a recording medium (e.g., a DVD) reading portion 2535, operation keys 2536, a speaker portion 2537, an antenna 2538, and the like. A power receiving device of the invention includes inside the main body 2531 a signal processing circuit and a battery, and thus can receive a radio signal from outside the device through the antenna 2538 and charge the battery. Accordingly, when charging the battery, electric power can be supplied to the display of the first display portion 2533 and the second display portion 2534, and the like without using a battery charger.

Figure 25E:
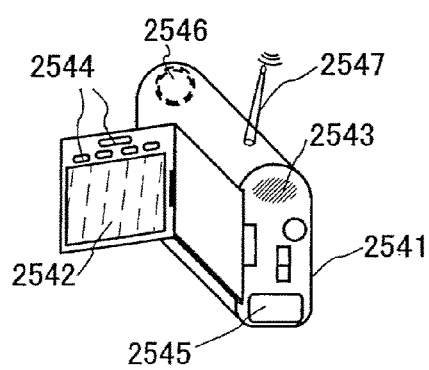

FIG. 25E shows a digital video camera that includes a main body 2541, a display portion 2542, an audio input portion 2543, operation switches 2544, a battery 2545, an image receiving portion 2546, an antenna 2547, and the like. A power receiving device of the invention includes inside the main body 2541 a signal processing circuit and a battery, and thus can receive a radio signal from outside the device through the antenna 2547 and charge the battery. Accordingly, when charging the battery, electric power can be supplied to the display of the display portion 2542, and the like without using a battery charger.

Figure 25F:
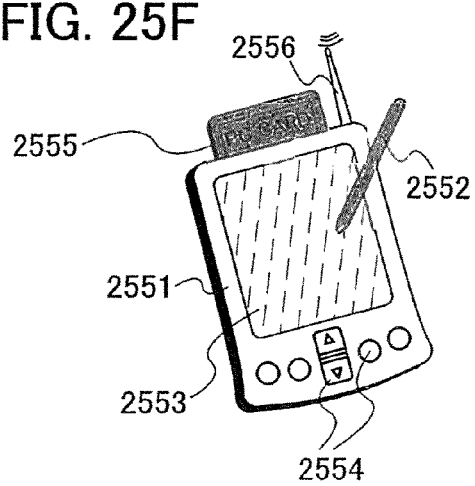

FIG. 25F shows a portable information terminal that includes a main body 2551, a stylus 2552, a display portion 2553, operation buttons 2554, an external interface 2555, an antenna 2556, and the like. A power receiving device of the invention includes inside the main body 2551 a signal processing circuit and a battery, and thus can receive a radio signal from outside the device through the antenna 2556 and charge the battery. Accordingly, when charging the battery, electric power can be supplied to the display of the display portion 2553, and the like without using a battery charger.

Figure 26A:
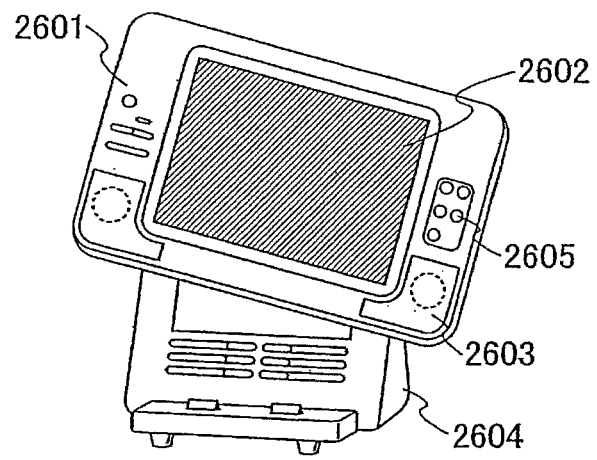
FIGS. 26A and 26B illustrate modes of an embodiment.
Figure 26B:
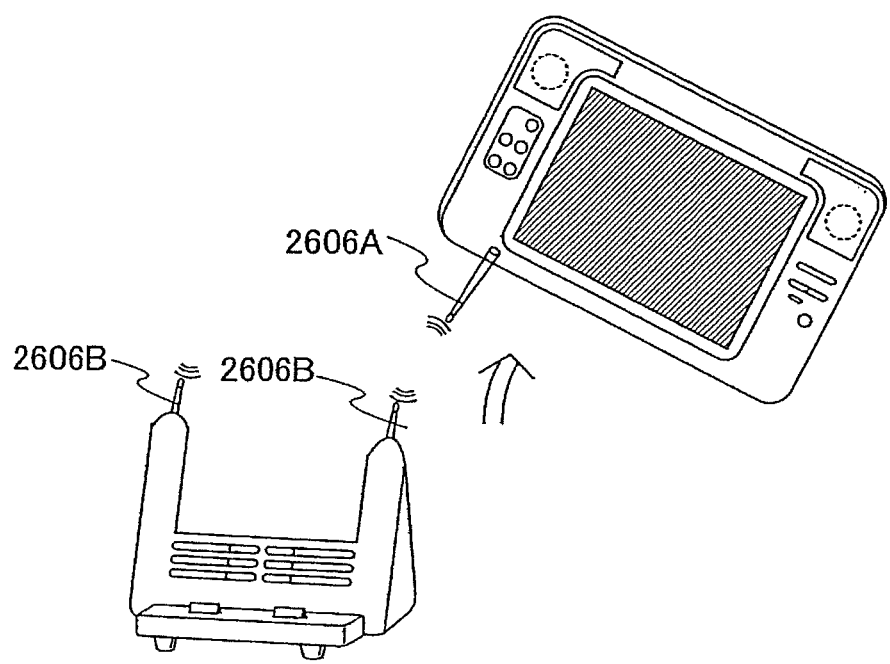

FIGS. 26A and 26B show a wireless television having a portable display. An image signal receiver and the power receiving device of the invention are built into a housing 2601. A battery inside the power receiving device drives a display portion 2602 and speaker portions 2603. The battery can be charged by a radio signal which the power receiving device receives from a power feeder 2604. Electric power can be supplied by the signal, which is transmitted wirelessly and supplied to an antenna 2606A provided on the display side from antennas 2606B provided on the power feeder side.

Further, the power feeder 2604 can transmit and receive image signals. Therefore, even if the display is detached from the power feeder, as shown in the structure in FIG. 26B, image signals can be transmitted to the signal receiver of the display. The housing 2601 is controlled by the operation keys 2605. Further, in the device shown in FIGS. 26A and 26B, by operating the operation keys 2605, a signal can be transmitted from the housing 2601 to the power feeder 2604, so the device can also be called an audio-visual two-way transmission device. Further, by operating the operation keys 2605, a signal can be transmitted from the housing 2601 to the power feeder 2604, and still further, by having another electronic device receive a signal that the power feeder 2604 can transmit, communication control of the other electronic device is possible. Therefore, the device shown in FIGS. 26A and 26B can also be called a general-purpose remote control device.

Note that by fitting the power feeder with the display portion 2602 and the speaker portions 2603, the device can be used as a stationary television. When the device has the form of a stationary television, it may have a structure in which the power feeder is directly connected with and supplies electric power to the display portion 2602 and the speaker portions 2603.

Figure 27A:
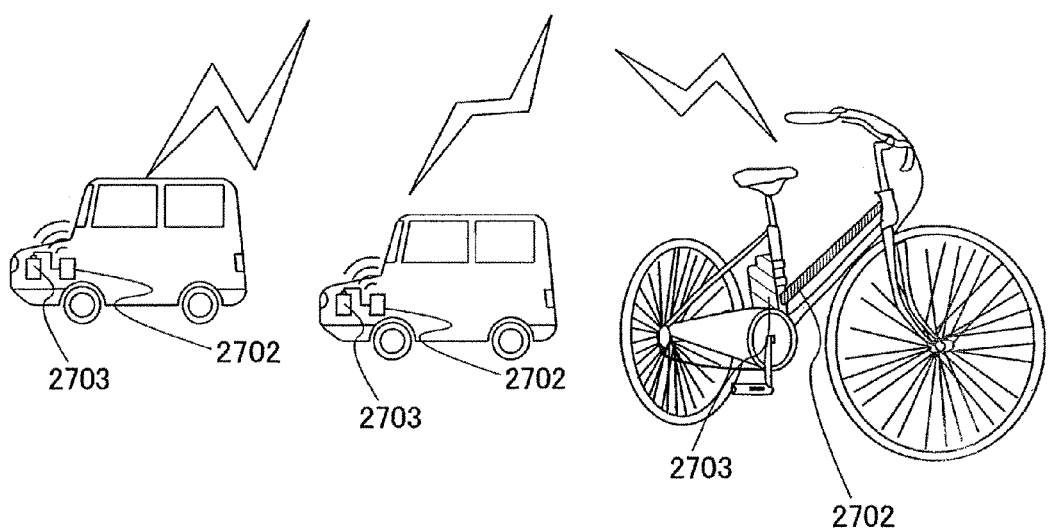
FIGS. 27A and 27B illustrate modes of an embodiment.

Further, an electric power supply system for a movable electronic device such as a motor vehicle or a bicycle having a battery using a large-scale power feeder, shown in FIG. 27A, is described.

A power feeder 2700 in FIG. 27A employs a parabolic antenna 2701 having a reflective surface that is parabolically curved, and transmits electric power to a motor vehicle or a bicycle having a power receiving device including an antenna 2702 and a battery 2703 by a radio signal. This is particularly advantageous when the battery goes flat in a motor vehicle, when power generation by a generator employing motive power of a combustion engine is difficult. Further, for bicycles such as a bicycle that can travel on hills and such places where traveling by human power is difficult by using motive power employing electric power, or a so-called bicycle with an assist facility, even if the battery goes flat, charging of the battery can be completed by a set period of time passing. The bicycle with an assist facility includes an electric motor and a battery. This structure is advantageous for a bicycle including a battery because the battery can be charged without using a household alternating current power supply, so the bicycle user is relieved of the burden of charging the battery using a cable.

Figure 27B:
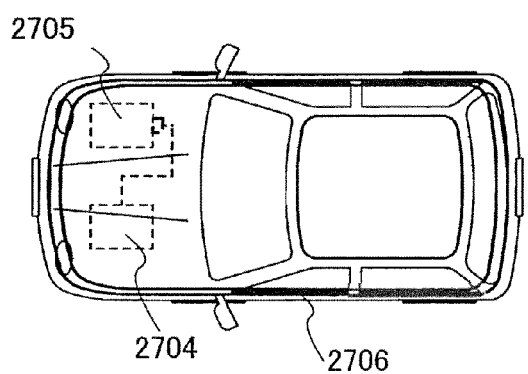

Further, it is advantageous if the motor vehicle shown in FIG. 27A has a booster antenna, described in a previous embodiment mode. FIG. 27B shows a structure of a motor vehicle which includes a power receiving device and a booster antenna. In the structure in FIG. 27B, there is no particular limitation on where to provide a booster antenna 2706, as long as the structure is one in which electromagnetic induction caused by magnetic coupling of the booster antenna and an antenna 2704 connected to a battery 2705 provided in the motor vehicle occurs. However, due to functional considerations, the booster antenna should have a larger form than the antenna. Therefore, for example, the booster antenna may be provided around the circumference of the motor vehicle, as shown in FIG. 27B, or may be provided in a plurality of places, such as the front windscreen or the rear windscreen.

Further, the structure of the power feeder and the power receiving device provided in a movable electronic device can take diverse forms. An example will be described with reference to FIGS. 28A and 28B.

Figure 28A:
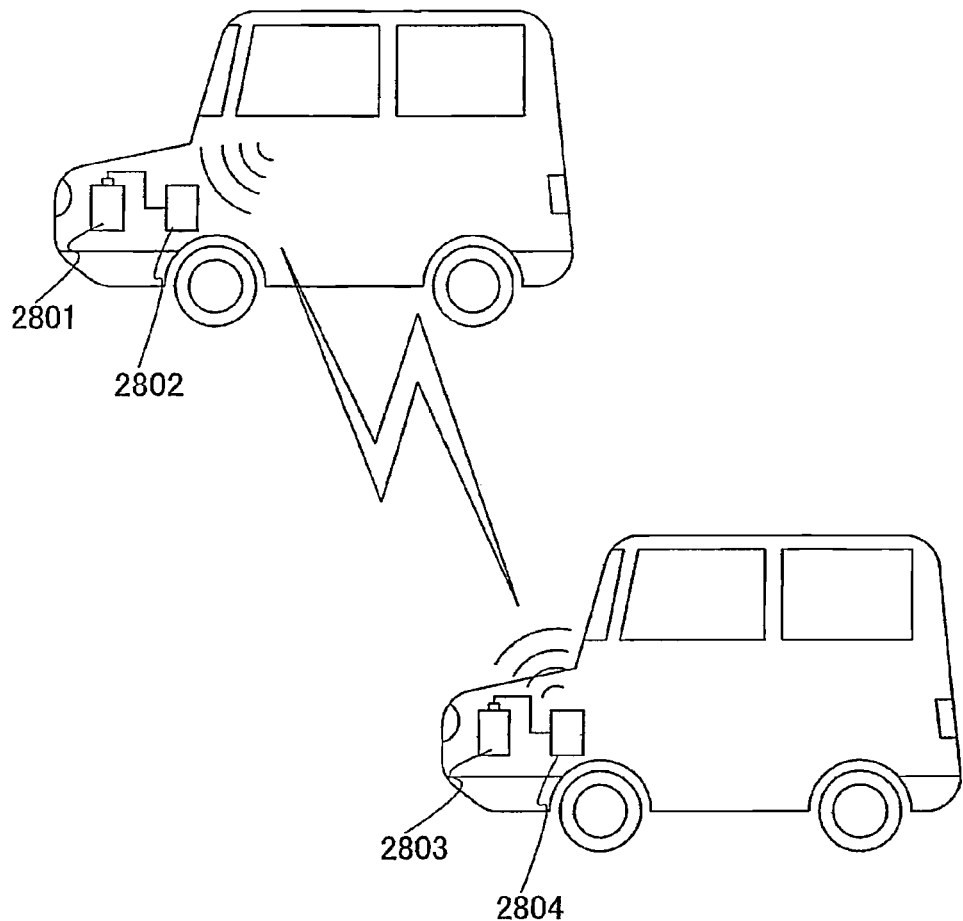
FIGS. 28A and 28B illustrate modes of an embodiment.

FIG. 28A shows a structure of an interactive electric power supply system for motor vehicles which includes a power receiving device including a means of moving and a power feeder. In FIG. 28A, the structure of each motor vehicle includes a battery and an antenna. Here, the antenna of one of the motor vehicles includes a battery 2801, and the antenna functions as a power-receiving antenna 2802. Meanwhile, the other motor vehicle includes a battery 2803, and the antenna functions as a power-supplying antenna 2804.

In the structure shown in FIG. 28A, even if the battery 2801 of one motor vehicle goes flat, the battery 2801 can be charged by outputting electric power charged to the battery 2803 of the other motor vehicle from the power-supplying antenna 2804 to the power-receiving antenna 2802 as a radio signal. Note that by decreasing the distance between the power-receiving antenna 2802 and the power-supplying antenna 2804 and outputting a radio signal for electric power supply, charging time can be reduced by electromagnetic induction which occurs due to magnetic coupling. In the structure shown in FIG. 28A, there is no need to connect the batteries of the motor vehicles together by a cable in order to supply electric power, as has been done conventionally. This embodiment is very advantageous, since charging can be conducted by the antenna receiving a signal even if the motor vehicle users are waiting in the motor vehicles. Further, in the invention, a plurality of other motor vehicles can be disposed and the battery can be charged from a plurality of power-supplying antennas. Therefore, battery charging time can also be reduced.

Figure 28B:
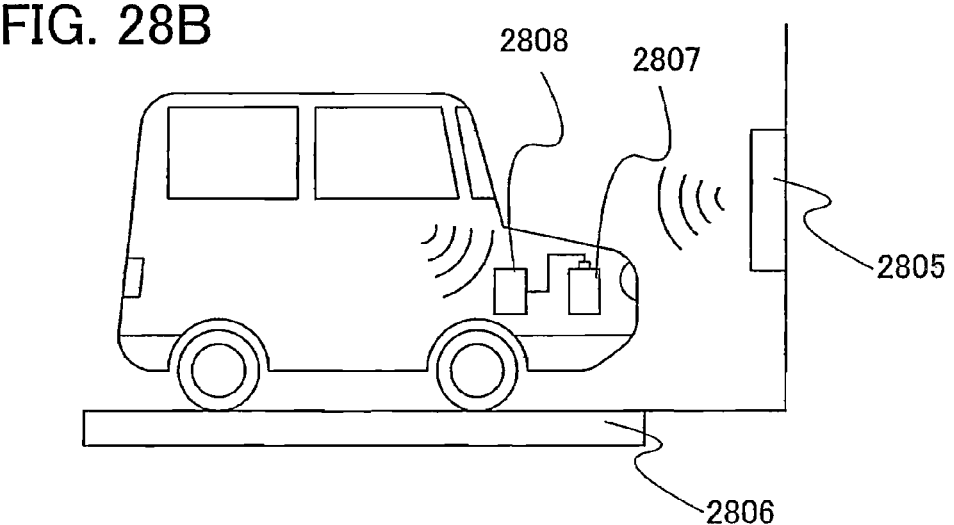

A different structure to the one shown in 28A will be described with reference to 28B. The structure shown in FIG. 28B is particularly advantageous for a so-called electric automobile, which obtains motive power from electric power. The electric automobile is driven using an electric motor.

In the structure shown in FIG. 28B, when the motor vehicle comes above a piezoelectric sensor 2806, supply of electric power by a radio signal from a power feeder 2805 is conducted. When electric power is supplied by a radio signal from the power feeder 2805, an antenna 2807 included in a power receiving device in the motor vehicle receives the radio signal, and a battery 2808 is charged. Accordingly, there is no need for a connection with a household alternating current power supply by a cable for the purpose of charging the battery 2808. The battery can be charged while a user of the motor vehicle is in the car, so convenience can be improved.

A power receiving device of the invention can be provided and used in anything that is driven using electric power.

Note that in a mode of a movable electronic device shown in this embodiment, the form of an antenna is not limited to those shown in the drawings. The antenna can have a form shown in an above-described embodiment mode, if appropriate.

This embodiment can be freely combined with any of the above embodiment modes.

The present application is based on Japanese Priority application No. 2006-070379 filed on Mar. 15, 2006 with the Japanese Patent Office, the entire contents of which are hereby incorporated by reference.

EXPLANATION OF REFERENCE

100: movable electronic device. 101: power receiving device portion. 102: antenna circuit. 103: signal processing circuit. 104: battery. 105: power supply load portion. 106: rectifier circuit. 108: power supply circuit. 109: display portion. 110: integrated circuit portion. 111: pixel portion. 112: display control portion. 201: power feeder. 401: antenna. 402: resonant capacitor. 403: antenna circuit. 404: diode. 405: diode. 406: smoothing capacitor. 407: rectifier circuit. 600: power feeder. 601: power transmission control portion. 602: antenna circuit. 603: antenna. 604: resonant capacitor. 700: power receiving device portion. 702: antenna circuit. 703: power transmission control portion. 704: antenna circuit. 705: antenna. 1600: power receiving device portion. 1601: antenna. 1602: booster antenna. 1603: antenna circuit. 851: electricity generation element. 909: drive portion. 910: peripheral power portion. 911: combustion engine portion. 912: drive control portion. 1001: resistor. 1002: transistor. 1003: transistor. 1004: current supply resistor. 1005: transistor. 1006: transistor. 1007: transistor. 1008: transistor. 1009: transistor. 1010: resistor. 102A: antenna circuit. 102B: booster antenna. 1301: substrate. 1302: insulating film. 1303: release layer. 1304: insulating film. 1305: semiconductor film. 1306: gate insulating film. 1307: gate electrode. 1308: impurity region. 1309: impurity region. 1310: insulating film. 1311: impurity region. 1313: conductive film. 1314: insulating film. 1316: conductive film. 1317: conductive film. 1318: insulating film. 1319: element formation layer. 1320: sheet material. 1321: sheet material. 1335: substrate. 1337: resin. 1338: conductive particles. 1801: substrate. 1802: insulating film. 1803: release layer. 1804: insulating film. 1805: conductive film. 1806: insulating film. 1807: insulating film. 1809:

gate insulating film. 1810: gate electrode. 1810*a*: conductive film. 1810*b*: conductive film. 1811: impurity region. 1812: insulating film. 1813: conductive film. 1814: insulating film. 1815: conductive film. 1816: conductive film. 1817: insulating film. 1818: sheet material. 1819: sheet material. 1820: element foiniation layer. 1832: substrate. 1834: resin. 1835: conductive particles. 1836: substrate. 2401: curve. 2402: curve. 2403: curve. 2404: curve. 2501: main body. 2502: audio output portion. 2503: audio input portion. 2504: display portion. 2505: operation switches. 2506: antenna. 2511: main body. 2512: housing. 2513: display portion. 2514: keyboard. 2515: external connection port. 2516: pointing device. 2517: antenna. 2521: main body. 2522: display portion. 2523: operation keys. 2524: speaker. 2525: shutter. 2526: image receiving portion. 2527: antenna. 2531: main body. 2532: housing. 2533: display portion. 2534: display portion. 2535: recording medium reading portion. 2536: operation keys. 2537: speaker portion. 2538: antenna. 2541: main body. 2542: display portion. 2543: audio input portion. 2544: operation switches. 2545: battery. 2546: image receiving portion. 2547: antenna. 2551: main body. 2552: stylus. 2553: display portion. 2554: operation buttons. 2555: external interface. 2556: antenna. 2601: housing. 2602: display portion. 2603: speaker portion. 2604: power feeder. 2605: operation keys. 2700: power feeder. 2701: parabolic antenna. 2702: antenna. 2703: battery. 2704: antenna. 2705: battery. 2706: booster antenna. 2801: battery. 2802: power-receiving antenna. 2803: battery. 2804: power-supplying antenna. 2805: power feeder. 2806: piezoelectric sensor. 2807: antenna. 2808: battery. 1300*a*: thin film transistor. 1300*b*: thin film transistor. 1300*c*: thin film transistor. 1300*d*: thin film transistor. 1300*e*: thin film transistor. 1300*f*: thin film transistor. 1305*a*: semiconductor film. 1305*b*: semiconductor film. 1305*c*: semiconductor film. 1305*d*: semiconductor film. 1305*e*: semiconductor film. 1305*f*: semiconductor film. 1307*a*: conductive film. 1307*b*: conductive film. 1312*a*: insulating film. 1312*b*: insulating film. 1315*a*: conductive film. 1315*b*: conductive film. 1331*a*: conductive film. 1331*b*: conductive film. 1332*a*: opening. 1332*b*: opening. 1334*a*: conductive film. 1334*b*: conductive film. 1336*a*: conductive film. 1336*b*: conductive film. 1800*a*: thin film transistor. 1800*b*: thin film transistor. 1800*c*: thin film transistor. 1800*d*: element. 1805*a*: conductive film. 1805*b*: conductive film. 1805*c*: conductive film. 1805*d*: conductive film. 1805*e*: conductive film. 1808*a*: semiconductor film. 1808*b*: semiconductor film. 1808*c*: semiconductor film. 1808*d*: semiconductor film. 1816*b*: conductive film. 1831*a*: conductive film. 1831*b*: conductive film. 1831*c*: conductive film. 1833*a*: conductive film. 1833*b*: conductive film. 2606A: antenna. 2606B: antenna.

What is claimed is:

1. An electric power supply system for motor vehicle comprising:
    an antenna circuit in a motor vehicle;
    an antenna comprised in the antenna circuit;
    a booster antenna configured to be provided in the motor vehicle and to be electromagnetically coupled to the antenna by magnetic field;
    a signal processing circuit electrically connected to the antenna circuit;
    a battery electrically connected to the signal processing circuit; and
    a spark plug electrically connected to the signal processing circuit,
    wherein the antenna comprised in the antenna circuit is configured to receive, via the booster antenna, a radio signal emitted by a power feeder,
    wherein the antenna circuit, the signal processing circuit, the battery and the spark plug are parts of the motor vehicle,
    wherein the battery is charged by the radio signal emitted by the power feeder and processed by the signal processing circuit, and
    wherein the spark plug is configured to be ignited by electric power stored in the battery and to start up a combustion engine of the motor vehicle.

2. The electric power supply system for motor vehicle according to claim 1, wherein the signal processing circuit includes a rectifier circuit and a power supply circuit.

3. The electric power supply system for motor vehicle according to claim 1, wherein the battery supplies electric power to a power supply circuit included in the signal processing circuit.

4. The electric power supply system for motor vehicle according to claim 1, wherein the battery includes at least one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

5. The electric power supply system according to claim 1, further comprising a sensor which is functionally connected to the power feeder and is configured to detect presence of the motor vehicle, and
    wherein the sensor is a piezoelectric sensor.

6. The electric power supply system according to claim 1, further comprising an electricity generation element electrically connected to the battery.

7. The electric power supply system according to claim 6, wherein the electricity generation element is a generator employing motive power of the combustion engine.

8. An electric power supply system for motor vehicle comprising:
    an antenna circuit in a motor vehicle;
    an antenna comprised in the antenna circuit;
    a booster antenna configured to be provided in the motor vehicle and to be electromagnetically coupled to the antenna by magnetic field;
    a signal processing circuit electrically connected to the antenna circuit; and
    a battery electrically connected to the signal processing circuit,
    wherein the antenna comprised in the antenna circuit is configured to receive, via the booster antenna, a radio signal emitted by a power feeder, and
    wherein the battery is charged by the radio signal processed by the signal processing circuit.

9. The electric power supply system for motor vehicle according to claim 8, wherein the signal processing circuit includes a rectifier circuit and a power supply circuit.

10. The electric power supply system for motor vehicle according to claim 8, wherein the battery supplies electric power to a power supply circuit included in the signal processing circuit.

11. The electric power supply system for motor vehicle according to claim 8, wherein the battery includes at least one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

12. The electric power supply system according to claim 8,
further comprising a sensor which is functionally connected to the power feeder and is configured to detect presence of the motor vehicle, and
wherein the sensor is a piezoelectric sensor.

13. The electric power supply system according to claim 8, further comprising an electricity generation element electrically connected to the battery.

14. The electric power supply system according to claim 13, wherein the electricity generation element is a generator employing motive power of a combustion engine.

15. The electric power supply system according to claim 1,
wherein the antenna and the booster antenna are configured so that the radio signal emitted by the power feeder is resonated by the booster antenna and transmitted to the antenna by electromagnetic induction caused by magnetic coupling between the booster antenna and the antenna.

16. The electric power supply system according to claim 8,
wherein the antenna and the booster antenna are configured so that the radio signal emitted by the power feeder is resonated by the booster antenna and transmitted to the antenna by electromagnetic induction caused by magnetic coupling between the booster antenna and the antenna.

17. The electric power supply system according to claim 1, wherein the booster antenna is provided around a circumference of the motor vehicle.

18. The electric power supply system according to claim 8, wherein the booster antenna is provided around a circumference of the motor vehicle.

19. The electric power supply system according to claim 1, wherein the booster antenna is provided in a windscreen of the motor vehicle.

20. The electric power supply system according to claim 8, wherein the booster antenna is provided in a windscreen of the motor vehicle.

* * * * *

UNITED STATES PATENT AND TRADEMARK OFFICE
CERTIFICATE OF CORRECTION

PATENT NO.       : 8,712,481 B2                                              Page 1 of 1
APPLICATION NO.  : 12/841381
DATED            : April 29, 2014
INVENTOR(S)      : Yutaka Shionoiri et al.

It is certified that error appears in the above-identified patent and that said Letters Patent is hereby corrected as shown below:

In the Specification

At column 12, line 3, "fowled" should be --formed--;

At column 12, line 8, "foamed" should be --formed--;

At column 13, line 22, "fainted" should be --formed--;

At column 13, line 35, "YAG;" should be --YAG,--;

At column 13, line 49, "YAG;" should be --YAG,--;

At column 13, line 51, "YAG;" should be --YAG,--;

At column 14, line 61, "Mimed" should be --formed--;

At column 15, line 35, "fowled" should be --formed--;

At column 16, line 54, "(AI)," should be --(A1),--;

At column 17, line 12, "fowled" should be --formed--;

At column 21, line 51, "faulted" should be --formed--;

At column 25, line 47, "foams" should be --forms--;

At column 25, line 66, "fowled" should be --formed--;

At column 26, line 52, "faulted" should be --formed--;

At column 27, line 38, "2501$a$" should be --2501 a--.

Signed and Sealed this
Ninth Day of September, 2014

Michelle K. Lee
*Deputy Director of the United States Patent and Trademark Office*